(12) United States Patent
Sekine et al.

(10) Patent No.: US 11,754,814 B2
(45) Date of Patent: Sep. 12, 2023

(54) IMAGING LENS

(71) Applicant: TOKYO VISIONARY OPTICS CO., LTD., Tokyo (JP)

(72) Inventors: Yukio Sekine, Sukagawa (JP); Masaya Hashimoto, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 0 days.

(21) Appl. No.: 17/391,788

(22) Filed: Aug. 2, 2021

(65) Prior Publication Data

US 2021/0364759 A1 Nov. 25, 2021

Related U.S. Application Data

(63) Continuation of application No. 17/364,263, filed on Jun. 30, 2021, which is a continuation of application No. 16/232,655, filed on Dec. 26, 2018, now abandoned.

(30) Foreign Application Priority Data

Dec. 26, 2017 (JP) ................. 2017-249708

(51) Int. Cl.
G02B 13/00 (2006.01)
G02B 9/60 (2006.01)

(52) U.S. Cl.
CPC ........... *G02B 13/0045* (2013.01); *G02B 9/60* (2013.01)

(58) Field of Classification Search
CPC .............. G02B 13/0045; G02B 9/60
See application file for complete search history.

(56) References Cited

U.S. PATENT DOCUMENTS

| 2014/0355134 A1* | 12/2014 | Sekine | G02B 27/0025 359/713 |
| 2016/0004044 A1* | 1/2016 | Kubota | G02B 9/62 359/713 |
| 2016/0011399 A1* | 1/2016 | Hashimoto | G02B 9/60 359/714 |
| 2016/0116715 A1 | 4/2016 | Ota | |
| 2016/0216488 A1 | 7/2016 | Kubota et al. | |

(Continued)

FOREIGN PATENT DOCUMENTS

JP 2015-225246 A 12/2015

*Primary Examiner* — William R Alexander
*Assistant Examiner* — Sharrief I Broome
(74) *Attorney, Agent, or Firm* — Hamre, Schumann, Mueller & Larson, P.C.

(57) ABSTRACT

There is provided an imaging lens with high-resolution which satisfies demand of the wide field of view, the low-profileness and the low F-number, and excellently corrects aberrations. An imaging lens comprises in order from an object side to an image side, a first lens having positive refractive power and a convex surface facing the object side near the optical axis, a second lens having negative refractive power near the optical axis, a third lens having the positive refractive power near the optical axis, a fourth lens, and a fifth lens having the negative refractive power and a concave surface facing the image side near the optical axis, wherein the image-side surface of said fifth lens is formed as an aspheric surface having at least one off-axial pole point, and predetermined conditional expressions are satisfied.

9 Claims, 24 Drawing Sheets

(56) References Cited

U.S. PATENT DOCUMENTS

2018/0052307 A1* 2/2018 Sekine .................... G02B 9/60
2019/0129149 A1   5/2019 Yao
2019/0170970 A1   6/2019 Chen et al.
2019/0391366 A1* 12/2019 Yamazaki .......... G02B 13/0045
2019/0391371 A1* 12/2019 Sekine ............... G02B 13/0045

* cited by examiner

IMAGING LENS

The present application is based on and claims priority of a Japanese patent application No. 2017-249708 filed on Dec. 26, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly relates to an imaging lens which is built in an increasingly compact and high-performance smartphone and mobile phone, an information terminal such as a PDA (Personal Digital Assistant), a game console, PC and a robot, and moreover, a home appliance with camera function, a monitoring camera and an automobile.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and have high-resolution performance.

As a conventional imaging lens aiming high performance, for example, the imaging lens disclosed in Patent Document 1 (JP2015-225246A) has been known.

Patent Document 1 discloses an imaging lens comprising, in order from an object side, a first lens having positive refractive power, a second lens, a third lens, a fourth lens having the positive refractive power, and a fifth lens having negative refractive power and a concave surface facing an image side near the optical axis.

SUMMARY OF THE INVENTION

However, in lens configurations disclosed in the Patent Document 1, when wide field of view, low-profileness and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, "a convex surface", "a concave surface" or "a plane surface" of lens surfaces implies that a shape of the lens surface near an optical axis (paraxial portion). "Refractive power" implies the refractive power near the optical axis. "A pole point" implies an off-axial point on an aspheric surface at which a tangential plane intersects the optical axis perpendicularly. "Total track length" is defined as a distance along the optical axis from an object-side surface of an optical element located closest to the object to an image plane. "The total track length" and a back focus is a distance obtained when thickness of an IR cut filter or a cover glass which may be arranged between the imaging lens and the image plane is converted into an air-converted distance.

An imaging lens according to the present invention comprises, in order from an object side to an image side, a first lens having positive refractive power and a convex surface facing the object side near the optical axis, a second lens having negative refractive power near the optical axis, a third lens having the positive refractive power near the optical axis, a fourth lens, and a fifth lens having the negative refractive power and a concave surface facing the image side near the optical axis, wherein the image-side surface of the fifth lens is formed as an aspheric surface having at least one off-axial pole point.

According to the imaging lens having the above-described configuration, the first lens achieves wide field of view and low-profileness by strengthening the refractive power. The second lens properly corrects spherical aberration and chromatic aberration. The third lens properly corrects astigmatism, coma aberration and distortion. The fourth lens properly corrects the astigmatism, field curvature, the distortion and the chromatic aberration. The fifth lens secures a back focus while maintaining the low-profileness. The image-side surface of the fifth lens has the concave surface facing the image side near the optical axis, and the field curvature and the distortion can be properly corrected and the light ray incident angle to an image sensor can be properly controlled, when the image-side surface of the fifth lens is formed as the aspheric surface having at least one off-axial pole point.

According to the imaging lens having the above-described configuration, it is preferable that the object-side surface of the third lens has the concave surface facing the object side near the optical axis.

When the object-side surface of the third lens has the concave surface facing the object side near the optical axis, the light ray incident angle to the object-side surface of the third lens can be appropriately controlled, and the astigmatism and the distortion can be properly corrected.

According to the imaging lens having the above-described configuration, it is preferable that the image-side surface of the third lens has the convex surface facing the image side near the optical axis.

When the image-side surface of the third lens has the convex surface facing the image side near the optical axis, the light ray incident angle to the image-side surface of the third lens can be appropriately controlled, and the coma aberration and the spherical aberration can be properly corrected.

According to the imaging lens having the above-described configuration, it is preferable that the object-side surface of the fifth lens has the convex surface facing the object side near the optical axis.

When the object-side surface of the fifth lens has the convex surface facing the object side near the optical axis, the astigmatism, the field curvature and the distortion can be properly corrected.

According to the imaging lens having the above-described configuration, it is preferable that the object-side surface of the fifth lens is formed as the aspheric surface having at least one off-axial pole point.

When the object-side surface of the fifth lens is formed as the aspheric surface having at least one off-axial pole point, the field curvature and the distortion can be properly corrected and the light ray incident angle to an image sensor can be properly controlled, According to the imaging lens having the above-described configuration, it is preferable that a below conditional expression (1) is satisfied:

$$0.15 < vd4/vd5 < 0.55 \quad (1)$$

where vd4: abbe number at d-ray of the fourth lens,
vd5: abbe number at d-ray of the fifth lens.

The conditional expression (1) defines an appropriate range the respective abbe numbers at d-ray of the fourth lens and the fifth lens. By satisfying the conditional expression (1), the chromatic aberration can be properly corrected.

According to the imaging lens having the above-described configuration, it is preferable that a below conditional expression (2) is satisfied:

$$0.7 < T1/T2 < 3.0 \quad (2)$$

where

T1: distance along the optical axis from the image-side surface of the first lens to the object-side surface of the second lens,
T2: distance along the optical axis from the image-side surface of the second lens to the object-side surface of the third lens.

The conditional expression (2) defines an appropriate range of an interval along the optical axis between the first lens and the second lens, and the interval along the optical axis between the second lens and the third lens. By satisfying the conditional expression (2), each lens interval becomes appropriate and the total track length is suppressed from being increased. Furthermore, by satisfying the conditional expression (2), the second lens is arranged at an optimum position, and aberration correction function of the lens becomes more effective.

According to the imaging lens having the above-described configuration, it is preferable that a below conditional expression (3) is satisfied:

$$1.1 < |r7|/r8 \quad (3)$$

where r7: paraxial curvature radius of the object-side surface of the fourth lens,
r8: paraxial curvature radius of the image-side surface of the fourth lens.

The conditional expression (3) defines shapes of the object-side surface and the image-side surface of the fourth lens by a ratio of paraxial curvature radii. When a value is above the lower limit of the conditional expression (3), the spherical aberration and the distortion can be properly corrected.

According to the imaging lens having the above-described configuration, it is preferable that a below conditional expression (4) is satisfied:

$$6 < (T1/f) \times 100 < 18 \quad (4)$$

where

T1: distance along the optical axis from the image-side surface of the first lens to the object-side surface of the second lens,
f: focal length of the overall optical system of the imaging lens.

The conditional expression (4) defines an appropriate range of the distance along the optical axis from the image-side surface of the first lens to the object-side surface of the second lens. By satisfying the conditional expression (4), the total track length can be shortened, and the astigmatism and the distortion are properly corrected.

According to the imaging lens having the above-described configuration, it is preferable that a below conditional expression (5) is satisfied:

$$1.6 < |r7|/f \quad (5)$$

where r7: paraxial curvature radius of the object-side surface of the fourth lens,
f: focal length of the overall optical system of the imaging lens.

The conditional expression (5) defines an appropriate range of the paraxial curvature radius of the object-side surface of the fourth lens. When the value is above the lower limit of the conditional expression (5), the spherical aberration and the distortion are properly corrected.

According to the imaging lens having the above-described configuration, it is preferable that a below conditional expression (6) is satisfied:

$$0.7 < (T3/f) \times 100 < 2.7 \quad (6)$$

where

T3: distance along the optical axis from the image-side surface of the third lens to the object-side surface of the fourth lens,
f: focal length of the overall optical system of the imaging lens.

The conditional expression (6) defines an appropriate range of the distance along the optical axis from the image-side surface of the third lens to the object-side surface of the fourth lens. By satisfying the conditional expression (6), the total track length can be shortened, and the coma aberration and the distortion are properly corrected.

According to the imaging lens having the above-described configuration, it is preferable that a below conditional expression (7) is satisfied:

$$2.35 < T2/T3 < 8.10 \quad (7)$$

where

T2: distance along the optical axis from the image-side surface of the second lens to the object-side surface of the third lens,
T3: distance along the optical axis from the image-side surface of the third lens to the object-side surface of the fourth lens.

The conditional expression (7) defines an appropriate range of an interval along the optical axis between the second lens and the third lens and an interval along the optical axis between the third lens and the fourth lens. By satisfying the conditional expression (7), each lens interval becomes appropriate and the total track length is suppressed from being increased. Furthermore, by satisfying the conditional expression (7), the third lens is arranged at an optimum position, and aberration correction function of the lens becomes more effective.

According to the imaging lens having the above-described configuration, it is preferable that a below conditional expression (8) is satisfied:

$$0.55 < D4/D5 < 1.20 \quad (8)$$

where

D4: thickness along the optical axis of the fourth lens,
D5: thickness along the optical axis of the fifth lens.

The conditional expression (8) defines an appropriate range of the thickness along the optical axis of the fourth lens and the thickness along the optical axis of the fifth lens. By satisfying the conditional expression (8), each lens thickness becomes appropriate and the total track length can be shortened. Furthermore, the formability of the lens becomes proper.

According to the imaging lens having the above-described configuration, it is preferable that a below conditional expression (9) is satisfied:

$$-0.65 < r6/f < -0.10 \quad (9)$$

where r6: paraxial curvature radius of the image-side surface of the third lens, f: focal length of the overall optical system of the imaging lens.

The conditional expression (9) defines an appropriate range of the paraxial curvature radius of the image-side surface of the third lens. When a value is below the upper limit of the conditional expression (9), it becomes facilitated to suppress the spherical aberration and the distortion occurred at this surface and to reduce sensitivity to manufacturing error, while maintaining the refractive power of the image-side surface of the third lens. On the other hand, when a value is above the lower limit of the conditional expression (9), it becomes possible to properly correct the astigmatism and the field curvature.

According to the imaging lens having the above-described configuration, it is preferable that a below conditional expression (10) is satisfied:

$$8.5 < (D3/f3) \times 100 < 50.0 \tag{10}$$

where

D3: thickness along the optical axis of the third lens, f3: focal length of the third lens.

The conditional expression (10) defines an appropriate range of the thickness along the optical axis of the third lens. When a value is below the upper limit of the conditional expression (10), the thickness along the optical axis of the third lens is suppressed from being too large, and an air gap of the object side and the image side of the third lens can be easily secured. As a result, the low-profileness can be maintained. On the other hand, when the value is above the lower limit of the conditional expression (10), the thickness along the optical axis of the third lens is suppressed from being too small, and the formability of the lens becomes excellent.

According to the imaging lens having the above-described configuration, it is preferable that a below conditional expression (11) is satisfied:

$$0.35 < f3/f < 1.60 \tag{11}$$

where f3: focal length of the third lens, f: focal length of the overall optical system of the imaging lens.

The conditional expression (11) defines an appropriate range of the refractive power of the third lens. When a value is below the upper limit of the conditional expression (11), the positive refractive power of the third lens becomes appropriate and the low-profileness can be realized. On the other hand, when the value is above the lower limit of the conditional expression (11), the spherical aberration, the coma aberration and the distortion can be properly corrected.

According to the imaging lens having the above-described configuration, it is preferable that a below conditional expression (12) is satisfied:

$$-10.50 < f2/f3 < -1.75 \tag{12}$$

where f2: focal length of the second lens, f3: focal length of the third lens.

The conditional expression (12) defines an appropriate range of the refractive power of the second lens and the third lens. When a value is below the upper limit of the conditional expression (12), the coma aberration and the astigmatism can be properly corrected. On the other hand, when the value is above the lower limit of the conditional expression (12), the field curvature can be properly corrected.

According to the imaging lens having the above-described configuration, it is preferable that a below conditional expression (13) is satisfied:

$$-1.10 < f3/f5 < -0.15 \tag{13}$$

where f3: focal length of the third lens, f5: focal length of the fifth lens.

The conditional expression (13) defines an appropriate range of the refractive power of the third lens and the fifth lens. When a value is below the upper limit of the conditional expression (13), the astigmatism can be properly corrected. On the other hand, when the value is above the lower limit of the conditional expression (13), the refractive power of the third lens becomes appropriate and the low-profileness can be realized. Furthermore, the chromatic aberration can be properly corrected.

According to the imaging lens having the above-described configuration, it is preferable that a below conditional expression (14) is satisfied:

$$1.0 < r8/f < 5.1 \tag{14}$$

where r8: paraxial curvature radius of the image-side surface of the fourth lens, f: focal length of the overall optical system of the imaging lens.

The conditional expression (14) defines an appropriate range of the paraxial curvature radius of the image-side surface of the fourth lens. When a value is below the upper limit of the conditional expression (14), the astigmatism and the coma aberration can be properly corrected. On the other hand, when the value is above the lower limit of the conditional expression (14), it becomes facilitated to suppress the spherical aberration and the distortion occurred at this surface and to reduce the sensitivity to manufacturing error, while maintaining the refractive power of the image-side surface of the fourth lens.

According to the imaging lens having the above-described configuration, it is preferable that a below conditional expression (15) is satisfied:

$$-7.3 < f4/f < -1.3 \tag{15}$$

where f4: focal length of the fourth lens, f: focal length of the overall optical system of the imaging lens.

When the fourth lens has the negative refractive power, the chromatic aberration can be properly corrected. The conditional expression (15) defines an appropriate range of the refractive power of the fourth lens. When a value is below the upper limit of the conditional expression (15), the negative refractive power of the fourth lens becomes appropriate, and the low-profileness can be achieved. On the other hand, when the value is above the lower limit of the conditional expression (15), the chromatic aberration and the spherical aberration can be properly corrected.

According to the imaging lens having the above-described configuration, it is preferable that composite refractive power of the second lens and the third lens is positive, and more preferable that a below conditional expression (16) is satisfied:

$$0.35 < f23/f < 2.00 \tag{16}$$

where f23: composite focal length of the second lens and the third lens, f: focal length of the overall optical system of the imaging lens.

When the composite refractive power of the second lens and the third lens is positive, the low-profileness is more facilitated. The conditional expression (16) defines an appropriate range of the composite refractive power of the second lens and the third lens. When a value is below the upper limit of the conditional expression (16), the positive composite refractive power of the second lens and the third lens become appropriate, and the low-profileness can be achieved. On the other hand, when the value is above the lower limit of the conditional expression (16), the spherical aberration and the coma aberration can be properly corrected.

According to the imaging lens having the above-described configuration, it is preferable that a below conditional expression (17) is satisfied:

$$0.6 < f1/f3 < 2.4 \qquad (17)$$

where f1: focal length of the first lens, f3: focal length of the third lens.

The conditional expression (17) defines an appropriate range of the refractive power of the first lens and the third lens. By satisfying the conditional expression (17), the positive refractive power is balanced to the first lens and the third lens, and the astigmatism and the distortion can be properly corrected while realizing the low-profileness and the wide field of view.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7, 9, 11, 13, 15, 17, 19, 21 and 23 are schematic views of the imaging lenses in Examples 1 to 12 according to the embodiments of the present invention, respectively.

Figure 1:
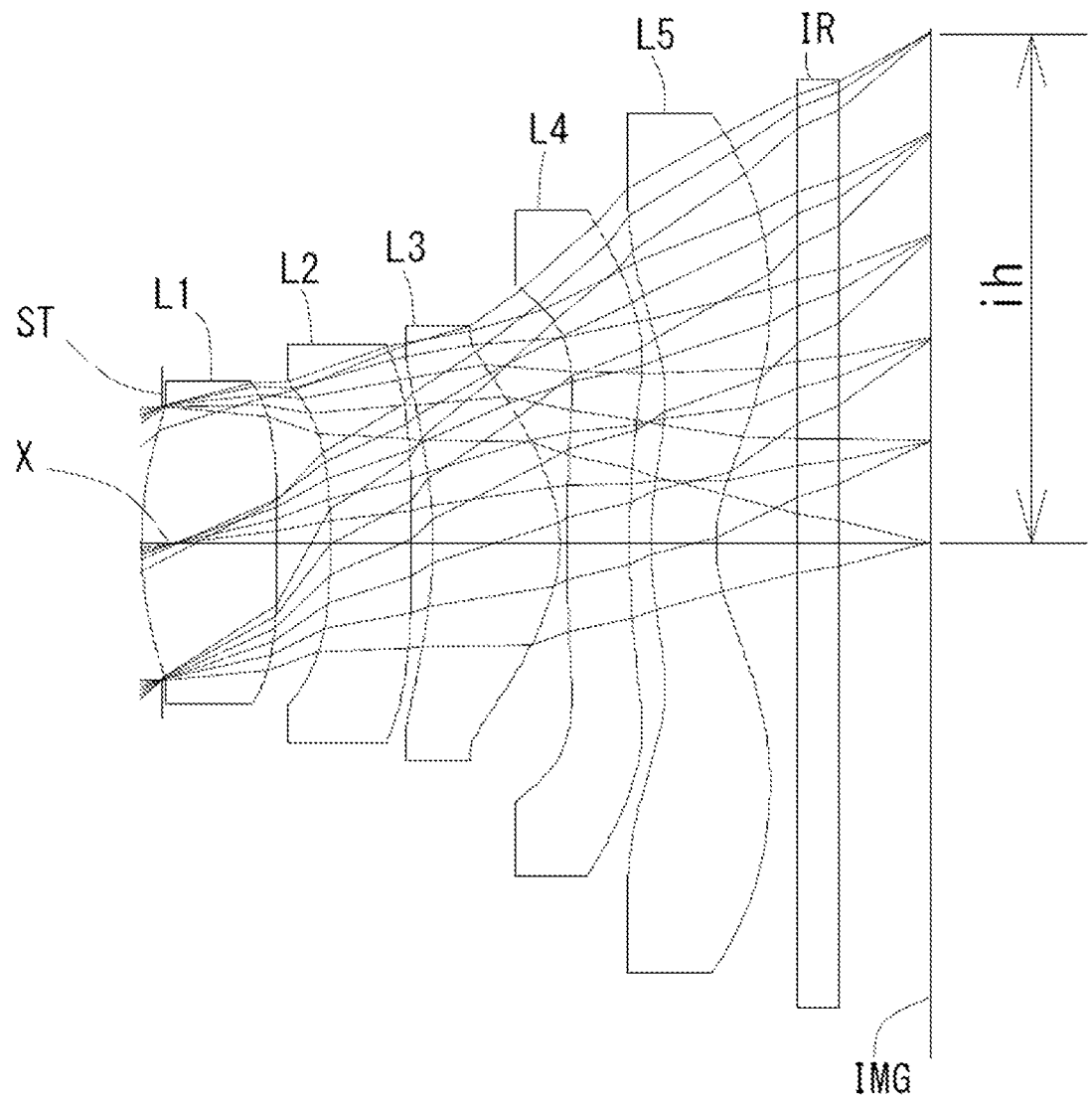
FIG. 1 is a schematic view showing a general configuration of an imaging lens in Example 1 according to the present invention.

As shown in FIG. 1, the imaging lens according to the present embodiment comprises in order from an object side to an image side, a first lens L1 having positive refractive power and a convex surface facing the object side near an optical axis X, a second lens L2 having the negative refractive power near the optical axis X, a third lens L3 having the positive refractive power near the optical axis X, a fourth lens L4, and a fifth lens L5 having negative refractive power and a concave surface facing an image side near the optical axis X. The image-side surface of the fifth lens L5 is formed as an aspheric surface having at least one off-axial pole point.

A filter IR such as an IR cut filter and a cover glass are arranged between the fifth lens L5 and an image plane IMG (namely, the image plane of an image sensor). The filter IR is omissible.

By arranging an aperture stop ST on the object side of the first lens L1, correction of aberrations and control of an incident angle of the light ray of high image height to the image sensor become facilitated.

The first lens L1 has the positive refractive power, and the wide field of view and the low-profileness are achieved by strengthening the refractive power. The shape of the first lens L1 is bi-convex shape having the convex surfaces facing the object side and the image side near the optical axis X, and the positive refractive power on the both sides is favorable for the low-profileness. The shape of the first lens L1 may be a meniscus shape having the convex surface facing the object side and the concave surface facing the image side near the optical axis X as in the Examples 2, 3, 4, 5, 6, 7, 8, 9, 10, 11 and 12 shown in FIGS. 3, 5, 7, 9, 11, 13, 15, 17, 19, 21 and 23. In this case, the spherical aberration, the astigmatism and the distortion are properly corrected.

The second lens L2 has the negative refractive power, and the spherical aberration and the chromatic aberration are properly corrected. The shape of the second lens L2 is the meniscus shape having the concave surface facing the object side and the convex surface facing the image side near the optical axis X, therefore the light ray incident angle to the second lens L2 is appropriately suppressed, and the coma aberration, the astigmatism and the distortion are properly corrected. The shape of the second lens L2 may be a bi-concave shape having the concave surfaces facing the object side and the image side near the optical axis X as in the Examples 4, 5, 6, 7, 9, 10, 11 and 12 shown in FIGS. 7, 9, 11, 13, 17, 19, 21 and 23. In this case, the negative refractive power on the both sides is favorable for correction of the chromatic aberration. Furthermore, as in the Example 8 shown in FIG. 15, the shape may be the meniscus shape having the convex surface facing the object side and the concave surface facing the image side near the optical axis X. In this case, the astigmatism, the field curvature and the distortion are properly corrected.

The third lens L3 has the positive refractive power, and the astigmatism, the coma aberration and the distortion are properly corrected. The shape of the third lens L3 is the meniscus shape having the concave surface facing the object side and the convex surface facing the image side near the optical axis X, therefore the light ray incident angle to the third lens L3 is appropriately suppressed, and the spherical aberration, the astigmatism, the coma aberration and the distortion are properly corrected.

The fourth lens L4 has the negative refractive power, and the astigmatism, the field curvature, the distortion and the chromatic aberration are properly corrected. The shape of the fourth lens L4 is the bi-concave shape having the concave surfaces facing the object side and the image side near the optical axis X, and the negative refractive power on the both sides is favorable for the correction of the chromatic aberration. Furthermore, the shape of the fourth lens L4 may be the meniscus shape having the convex surface facing the object side and the concave surface facing the image side near the optical axis X as in the Examples 3, 4, 5, 6, 7, 10 and 11 shown in FIGS. 5, 7, 9, 11, 13, 19 and 21. In this case, the astigmatism and the distortion are properly corrected.

The fifth lens L5 has the negative refractive power, and secures a back focus while maintaining the low-profileness. The shape of the fifth lens L5 is the meniscus shape having the convex surface facing the object side and the concave surface facing the image side near the optical axis X, and the astigmatism, the field curvature and the distortion are properly corrected. Furthermore, the object-side surface and the image-side surface of the fifth lens L5 are formed as the aspheric surfaces having at least one off-axial pole point, therefore the field curvature and the distortion are properly corrected and the light ray incident angle to an image sensor is properly controlled.

Regarding the imaging lens according to the present embodiments, all lenses of the first lens L1 to the fifth lens L5 are preferably single lenses. Configuration with only the single lenses can frequently use the aspheric surfaces. In the present embodiments, all lens-surfaces are formed as the appropriate aspherical surfaces, and proper aberration correction is made. In comparison with the case in which a cemented lens is used, workload is reduced, and manufacturing in low cost becomes possible.

Furthermore, the imaging lens according to the present embodiments makes manufacturing facilitated by using plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the below conditional expressions (1) to (17).

$$0.15 < vd4/vd5 < 0.55 \quad (1)$$

$$0.7 < T1/T2 < 3.0 \quad (2)$$

$$1.1 < |r7|/r8 \quad (3)$$

$$6 < (T1/f) \times 100 < 18 \quad (4)$$

$$1.6 < |r7|/f \quad (5)$$

$$0.7 < (T3/f) \times 100 < 2.7 \quad (6)$$

$$2.35 < T2/T3 < 8.10 \quad (7)$$

$$0.55 < D4/D5 < 1.20 \quad (8)$$

$$-0.65 < r6/f < -0.10 \quad (9)$$

$$8.5 < (D3/f3) \times 100 < 50.0 \quad (10)$$

$$0.35 < f3/f < 1.60 \quad (11)$$

$$-10.50 < f2/f3 < -1.75 \quad (12)$$

$$-1.10 < f3/f5 < -0.15 \quad (13)$$

$$1.0 < r8/f < 5.1 \quad (14)$$

$$-7.3 < f4/f < -1.3 \quad (15)$$

$$0.35 < f23/f < 2.00 \quad (16)$$

$$0.6 < f1/f3 < 2.4 \quad (17)$$

where
vd4: abbe number at d-ray of the fourth lens L4,
vd5: abbe number at d-ray of the fifth lens L5,
D3: thickness along the optical axis X of the third lens L3,
D4: thickness along the optical axis X of the fourth lens L4,
D5: thickness along the optical axis X of the fifth lens L5,
T1: distance along the optical axis X from the image-side surface of the first lens L1 to the object-side surface of the second lens L2,
T2: distance along the optical axis X from the image-side surface of the second lens L2 to the object-side surface of the third lens L3,
T3: distance along the optical axis X from the image-side surface of the third lens L3 to the object-side surface of the fourth lens L4,
f: focal length of the overall optical system of the imaging lens,
f1: focal length of the first lens L1,
f2: focal length of the second lens L2,
f3: focal length of the third lens L3,
f4: focal length of the fourth lens L4,
f5: focal length of the fifth lens L5,
f23: composite focal length of the second lens L2 and the third lens L3,
r6: paraxial curvature radius of the image-side surface of the third lens L3,
r7: paraxial curvature radius of the object-side surface of the fourth lens L4,
r8: paraxial curvature radius of the image-side surface of the fourth lens L4, It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (17a).

$$0.25 < vd4/vd5 < 0.45 \quad (1a)$$

$$0.95 < T1/T2 < 2.70 \quad (2a)$$

$$1.5 < |r7|/r8 \quad (3a)$$

$$7.5 < (T1/f) \times 100 < 15 \quad (4a)$$

$$2.4 < |r7|/f \quad (5a)$$

$$1.1 < (T3/f) \times 100 < 2.3 \quad (6a)$$

$$2.55 < T2/T3 < 6.80 \quad (7a)$$

$$0.70 < D4/D5 < 1.10 \quad (8a)$$

$$-0.50 < r6/f < -0.20 \quad (9a)$$

$$13 < (D3/f3) \times 100 < 42 \quad (10a)$$

$$0.5 < f3/f < 1.3 \quad (11a)$$

$$-8.5 < f2/f3 < -2.6 \quad (12a)$$

$$-0.9 < f3/f5 < -0.25 \quad (13a)$$

$$1.3 < r8/f < 4.2 \quad (14a)$$

$$-6 < f4/f < -2 \quad (15a)$$

$$0.55 < f23/f < 1.65 \quad (16a)$$

$$0.95 < f1/f3 < 2.00 \quad (17a)$$

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$

Equation 1

Next, examples of the imaging lens according to this embodiment will be explained. In each example, f denotes the focal length of the overall optical system of the imaging lens, Fno denotes a F-number, ω denotes a half field of view, ih denotes a maximum image height, and TTL denotes total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 | | | | |
|---|---|---|---|---|
| Unit mm | | | | |
| f = 2.68 | | | ih = 2.52 | |
| Fno = 2.0 | | | TTL = 3.80 | |
| ω(°) = 42.7 | | | | |

| Surface Data | | | | |
|---|---|---|---|---|
| Surface Number 1 (Object) | Curvature Radius r Infinity | Surface Distance d Infinity | Retractive Index Nd | Abbe Number vd |
| 1 (Stop) | Infinity | −0.1000 | | |
| 2* | 1.7534 | 0.6675 | 1.544 | 55.86 (vd1) |

TABLE 1-continued

Example 1

| | | | | |
|---|---|---|---|---|
| 3* | −18.0331 | 0.2612 | | |
| 4* | −5.6641 | 0.3965 | 1.671 | 19.48 (vd2) |
| 5* | −195.0012 | 0.1101 | | |
| 6* | −2.1474 | 0.6225 | 1.544 | 55.88 (vd3) |
| 7* | −0.7610 | 0.0400 | | |
| 8* | −44.5583 | 0.3043 | 1.661 | 20.37 (vd4) |
| 9* | 7.4588 | 0.1037 | | |
| 10* | 1.7928 | 0.3205 | 1.544 | 55.86 (vd5) |
| 11* | 0.7411 | 0.4000 | | |
| 12 | Infinity | 0.2100 | 1.563 | 51.30 |
| 13 | Infinity | 0.4407 | | |
| Image Plane | Infinity | | | |

Constituent Lens Data

| Lens | Start Surface | Focal Length | | Composite Focal Length |
|---|---|---|---|---|
| 1 | 2 | 2.971 | f23 | 2.106 |
| 2 | 4 | −8.696 | | |
| 3 | 6 | 1.870 | | |
| 4 | 8 | −9.641 | | |
| 5 | 10 | −2.600 | | |

Aspheric Surface Data

| | Second Surface | Third Surface | Fourth Surface | Fifth Surface | Sixth Surface | Seventh Surface |
|---|---|---|---|---|---|---|
| k | 1.700000E−01 | 0.000000E+00 | 0.000000E+00 | 0.000000E+00 | 0.000000E+00 | −4.395077E+00 |
| A4 | −4.292674E−02 | −2.085610E−01 | −3.687625E−01 | −1.562806E−01 | 9.332490E−02 | −3.217702E−01 |
| A6 | −8.646802E−02 | 6.065863E−03 | −1.505054E−02 | 1.428316E−04 | 2.546871E−01 | 0.905901E−01 |
| A8 | 1.967162E−01 | −1.423671E−01 | 6.593095E−02 | 1.206215E−01 | −9.235752E−01 | −1.281982E+00 |
| A10 | −4.321972E−01 | −3.190463E−01 | −1.379052E−01 | −1.295732E−01 | 1.437001E+00 | 1.6439442+00 |
| A12 | 5.075353E−03 | 6.533212E−01 | 2.206496E−01 | 2.820534E−02 | −1.255610E+00 | −1.348278E+00 |
| A14 | 2.121003E−66 | −3.926484E−01 | 5.318551E−04 | 1.134159E−02 | 6.6695046−01 | 6.847948E−01 |
| A16 | 0.000000E+00 | 0.000000E+00 | 0.000000E+00 | 0.000000E+00 | −1.634663E−01 | −1.422703E−01 |
| A19 | 0.000000E+00 | 0.000000E+00 | 0.000000E+00 | 0.000000E+00 | 0.000000E+00 | 0.0000006+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | −1.000000E+00 | 1.650704E+01 | −6.155729E+00 | −3.923916E+00 |
| A4 | 2.909541E−01 | 1.784037E−01 | −1.181658E−01 | −1.597280E−01 |
| A6 | −61834276−01 | −3.6248171E−01 | −3.399072E−01 | −2.791641E−02 |
| A8 | 7.6587462E−01 | 2.383160E−01 | 4.635308E−01 | 1.330657E−01 |
| A10 | −9.033039E−01 | −9.699358E−02 | −2.583673E−01 | −1.193019E−01 |
| A12 | 7.201596E−01 | 2.560516E−02 | 7.811685E−02 | 6.105535E−02 |
| A14 | −32644732−01 | −3.360505E−03 | −1.286130E−02 | −1.960171E−02 |
| A18 | 6.268259E−02 | 7.155706E−05 | 9.212000E−04 | 3.856278E−03 |
| A18 | 0.000000E+00 | 0.000000E−00 | 1.168066E−05 | −4.222043E−04 |
| A20 | 0.000000E+00 | 0.000000E+00 | −3.669913E−06 | 1.962306E−05 |

The imaging lens in Example 1 satisfies conditional expressions (1) to (1) as shown in Table 13.

Figure 2:
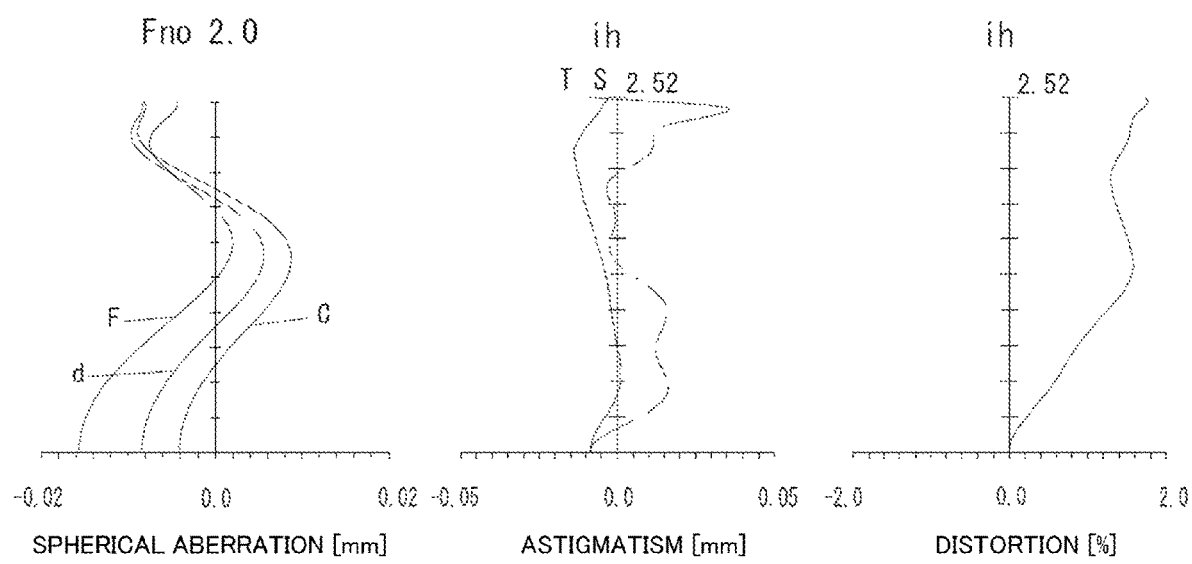
FIG. 2 shows spherical aberration, astigmatism, and distortion of the imaging lens in Example 1 according to the present invention.
Figure 3:
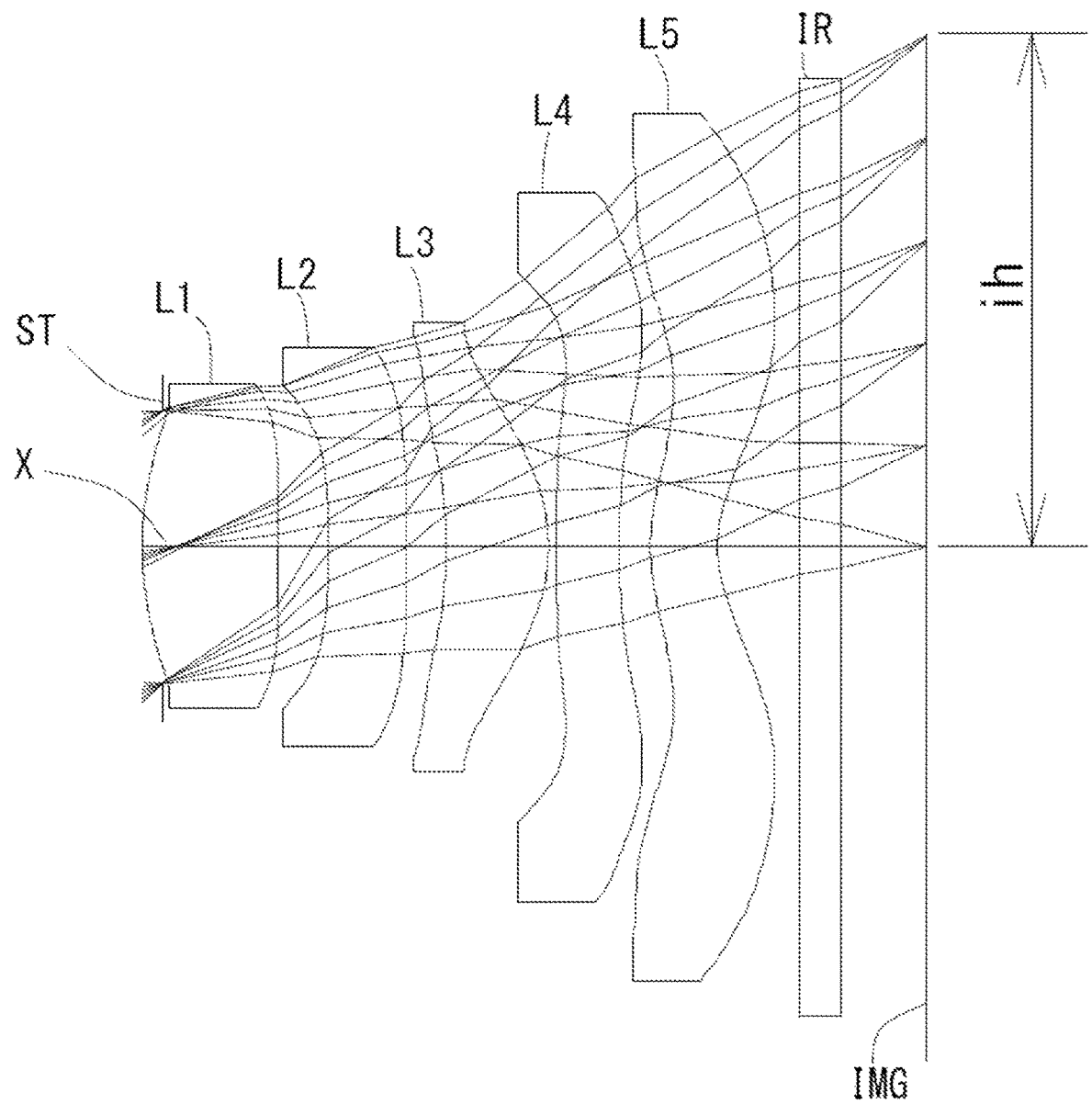
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10, 12, 14, 16, 18, 20, 22 and 24). As shown in FIG. 2, each aberration is corrected excellently.

Example 2

The basic lens data is shown below in Table 2.

TABLE 2

Example 2

Unit mm f = 2.68  ih = 2.52
Fno = 2.0  TTL = 3.79
ω(°) = 42.7

Surface Data

| Surface Number 1 | Curvature Radius r | Surface Distance d | Retractive Index Nd | Abbe Number vd |
|---|---|---|---|---|

TABLE 2-continued

Example 2

| (Object) | Infinity | Infinity | | |
|---|---|---|---|---|
| 1 (Stop) | Infinity | −0.1000 | | |
| 2* | 1.7426 | 0.6712 | 1.545 | 55.98 (vd1) |
| 3* | 35.3824 | 0.2468 | | |
| 4* | −7.2012 | 0.3836 | 1.671 | 19.48 (vd2) |
| 5* | −91.2748 | 0.1957 | | |
| 6* | −2.4067 | 0.5068 | 1.545 | 55.98 (vd3) |
| 7* | −0.9065 | 0.0400 | | |
| 8* | −51.3889 | 0.3113 | 3.671 | 19.48 (vd4) |
| 9* | 7.2981 | 0.1506 | | |
| 10* | 1.0273 | 0.3308 | 1.545 | 55.98 (vd5) |
| 11* | 0.6285 | 0.4000 | | |
| 12 | Infinity | 0.2100 | 1.563 | 51.30 |
| 13 | Infinity | 0.4231 | | |
| Image Plane | Infinity | | | |

Constituent Lens Data

| Lens | Start Surface | Focal Length | | Composite Focal Length |
|---|---|---|---|---|
| 1 | 2 | 3.343 | f23 | 2.730 |
| 2 | 4 | −11.676 | | |
| 3 | 6 | 2.387 | | |
| 4 | 8 | −9.507 | | |
| 5 | 10 | −4.199 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.0000000E−00 | −4.030101E+00 |
| A4 | −3.166508E−02 | −1.858009E−01 | −3.877875E−01 | −2.738824E−01 | −3.225875E−01 | −6.2267088E−01 |
| A6 | 6.175063E−02 | −7.483854E−02 | 2.171191E−01 | 6.335431E−01 | 1.331739E+00 | 1.709956E+00 |
| A8 | −5.484121E−01 | −1.9277766E−01 | −1.743992E+00 | −1.346926E+00 | −1.189293E+00 | −2.912531E+00 |
| A10 | 1.216451E−00 | −1.353446E−01 | 2.751067E+00 | 1.425215E+00 | −9.369386E−01 | 3.246003E+00 |
| A12 | −1.211958E+00 | 5.8286856E−01 | −1.099870E+00 | −7.857791E−01 | 2.794655E+00 | −1.9512716+00 |
| A14 | 1.501062E−03 | −4.717217E−01 | −1.651424E−01 | 1.835678E−01 | −2.2475356+00 | 4.699240E−01 |
| A16 | 0.000000E−00 | 0.000000E+00 | 0.000000E+00 | 0.000000E+00 | 6.375000E−01 | 4.839694E−03 |
| A18 | 0.000000E+00 | 0.0000006+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | −1.000000E+00 | 1.5474926+01 | −0.377219E+00 | −3.954190E+00 |
| A4 | 2.636937E−01 | 3.436333E−01 | −9.4005968E−02 | −1.833529E−01 |
| A6 | −1.226668E−01 | −6.6805606E−01 | −2.3971026E−01 | 4.6310076E−02 |
| A8 | −5.562251E−01 | 6.108770E−01 | 2.5513456E−01 | 3.555782E−02 |
| A10 | 9.752468E−01 | −3.539887E−01 | −1.383891E−01 | −5.2581686E−02 |
| A12 | −7.606770E−01 | 1.222869E−01 | 3.643126E−02 | 3.160545E−02 |
| A14 | 2.139313078E−01 | −2.212438E−02 | −5.217288E−03 | −1.041548E−02 |
| A16 | −4.291428E−02 | 1.558686E−03 | 3.259506E−04 | 1.914639E−03 |
| A18 | 0.11000006+00 | 0.000000E−00 | 3.190262E−06 | −1.8222586E−04 |
| A20 | 0.000000E+00 | 0.000000E+00 | −1.026926E−06 | 5.906664E−06 |

The imaging lens in Example 2 satisfies conditional expressions (1) to (17) as shown in Table 13.

Figure 4:
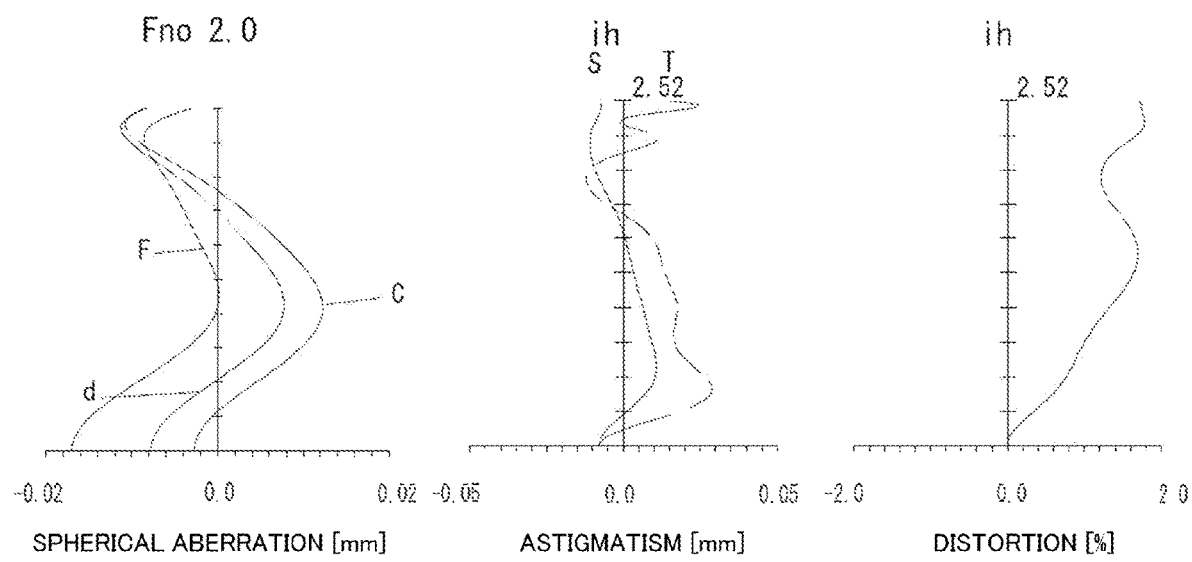
FIG. 4 shows spherical aberration, astigmatism, and distortion of the imaging lens in Example 2 according to the present invention.
Figure 5:
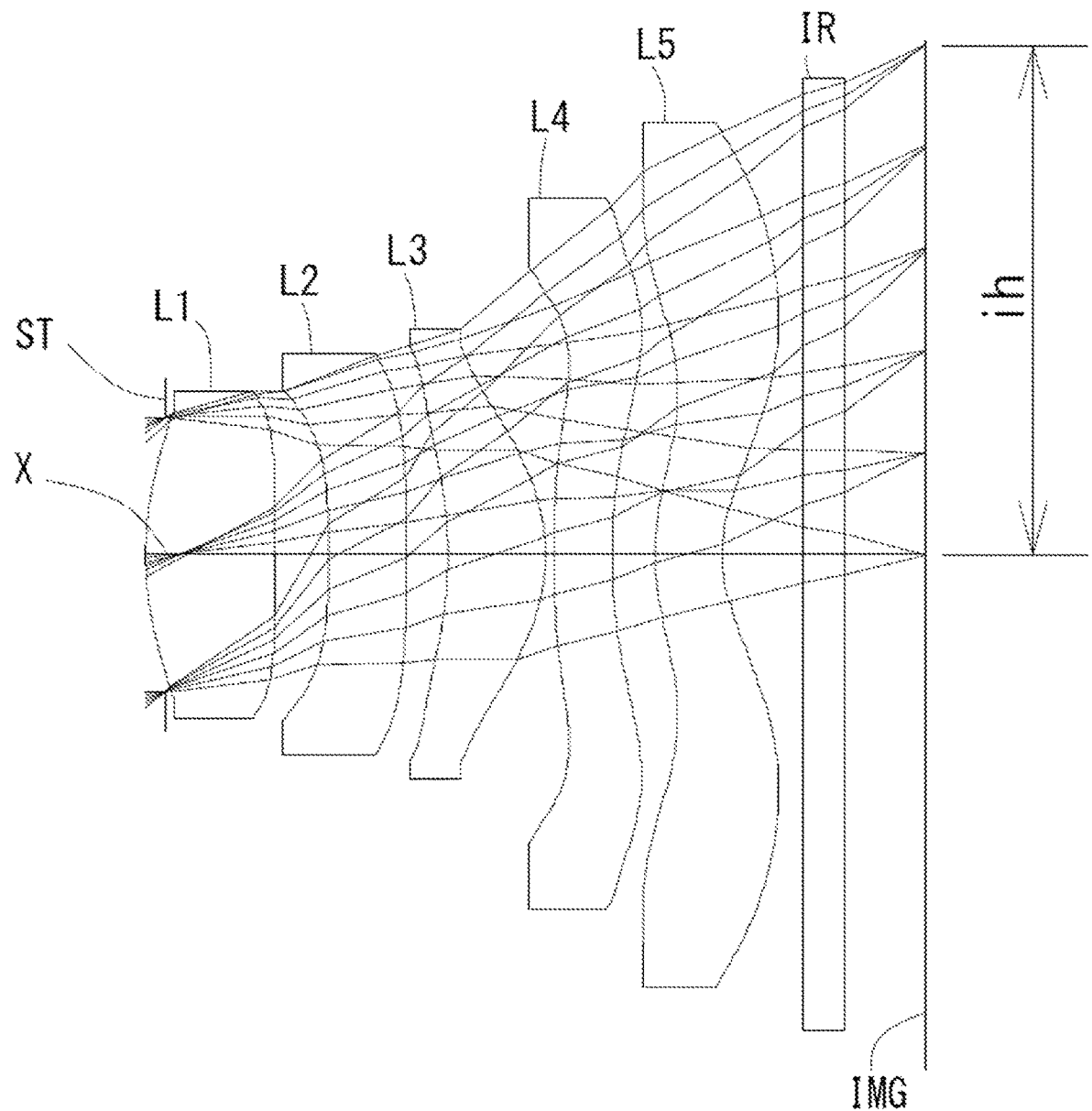
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

| Example 3 |
| --- |

| Unit mm | | | | |
| --- | --- | --- | --- | --- |
| f = 2.69 | | | ih = 2.52 | |
| Fno = 2.0 | | | TTL = 3.78 | |
| ω(°) = 42.9 | | | | |

| Surface Data | | | | |
| --- | --- | --- | --- | --- |
| Surface Number 1 (Object) | Curvature Radius r Infinity | Surface Distance d Infinity | Retractive Index Nd | Abbe Number vd |
| 1 (Step) | Infinity | −0.0950 | | |
| 2* | 1.7241 | 0.6394 | 1.544 | 55.86 (vd1) |
| 3* | 24.5198 | 0.2645 | | |
| 4* | −7.0905 | 0.3826 | 1.671 | 19.45 (vd2) |
| 5* | −159.8378 | 0.2036 | | |
| 6* | −2.4555 | 0.4843 | 1.544 | 55.86 (vd3) |
| 7* | −0.9741 | 0.0418 | | |
| 8* | 8.6888 | 0.2900 | 1.671 | 19.48 (vd4) |
| 9* | 4.3039 | 0.2078 | | |
| 10* | 1.0679 | 0.3300 | 1.544 | 55.86 (vd5) |
| 11* | 0.6611 | 0.4000 | | |
| 12 | Infinity | 0.2100 | 1.563 | 51.30 |
| 13 | Infinity | 0.3964 | | |
| Image Plane | Infinity | | | |

| Constituent Lens Data | | | | |
| --- | --- | --- | --- | --- |
| Lens | Start Surface | Focal Length | | Composite Focal Length |
| 1 | 2 | 3.374 | f23 | 3.160 |
| 2 | 4 | −11.063 | | |
| 3 | 6 | 2.660 | | |
| 4 | 8 | −13.050 | | |
| 5 | 10 | −4.466 | | |

| Aspheric Surface Data | | | | | | |
| --- | --- | --- | --- | --- | --- | --- |
| | Second Surface | Third Surface | Fourth Surface | Fifth Surface | Sixth Surface | Seventh Surface |
| k | 0.000000E+00 | 0.000000E+00 | 0.000000E+00 | 0.000000E+00 | 0.000000E+00 | −4.118862E+00 |
| A4 | −3.992709E−02 | −1.733135E−01 | −3.877875E−01 | −2.742323E−01 | −3.221010E−01 | −6.471027E−01 |
| A6 | 9.175217E−02 | −8.4132886E−02 | 3.007925E−01 | 6.336667E−01 | 1.150857E+00 | 1.754452E+00 |
| A8 | −6.2853085E−01 | −1.526177E−01 | −1.803132E+00 | −1.338173E+00 | −5.567719E−01 | −3.222746E+00 |
| A10 | 1.288895E+00 | −1.551019E−01 | 2.795328E+00 | 1.427221E+00 | −2.112198E+00 | 4.293519E+00 |
| A12 | −1.211958E+00 | 5.828682E−01 | −1.099870E+00 | −7.8553776E−01 | 3.973062E+00 | −3.542476E+00 |
| A14 | 1.500982E−03 | −4.717218E−01 | −1.661425E−01 | 1.800000E−01 | −2.872331E+00 | 1.564534E+00 |
| A16 | 0.000000E+00 | 0.000000E+00 | 0.000000E+00 | 0.000000E+00 | 7.826800E−01 | −2.726496E−01 |
| A18 | 0.000000E+00 | 0.000000E+00 | 0.000000E+00 | 0.0000006 +00 | 0.000000E+00 | 0.000000E+00 |
| A20 | 0.000000E+00 | 0.000000E+00 | 0.000000E+00 | 00000006+00 | 0.000000E+00 | 0.000000E+00 |

| | Eighth Surface | Ninth Surface | Tenth Surface | Eleventh Surface |
| --- | --- | --- | --- | --- |
| k | −1.000000E+00 | 0.000000E+00 | −1.056317E+01 | −4.1719375+00 |
| A4 | 2.256261E−01 | 3.577367E−01 | −7.956763E−02 | −1.649996E−01 |
| A6 | −2.302546E−01 | −7.974840E−01 | −1.959566E−01 | 4.433314E−02 |
| A8 | −2.277997E−01 | 8.431325E−01 | 2.159353E−01 | 1.560209E−02 |
| A10 | 5.692864E−01 | −5.876331E−01 | −9.658822E−02 | −2.565796E−02 |
| A12 | −4.642349E−01 | 2.742723E−01 | 2.356055E−02 | 1.480276E−02 |
| A14 | 1.9135095−01 | −8.606225E−02 | −3.119005E−03 | −4.883180E−03 |
| A16 | −2.878091E−02 | 1.821358E−02 | 1.798368E−04 | 8.269084E−04 |
| A18 | 0.000000E+00 | −2.431615E−03 | 1.581286E−06 | −7.533516E−05 |
| A20 | 0.000000E+00 | 1.5358025E−04 | −4.577922E−07 | 2.716481E−06 |

The imaging lens in Example 3 satisfies conditional expressions (1) to (17) as shown in Table 13.

Figure 6:
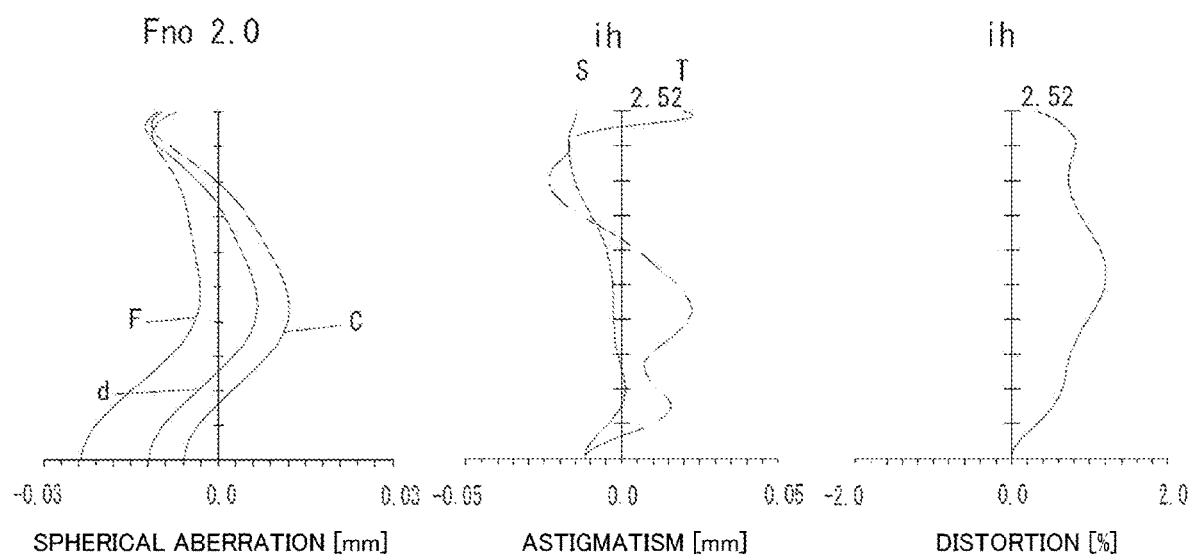
FIG. 6 shows spherical aberration, astigmatism, and distortion of the imaging lens in Example 3 according to the present invention.
Figure 7:
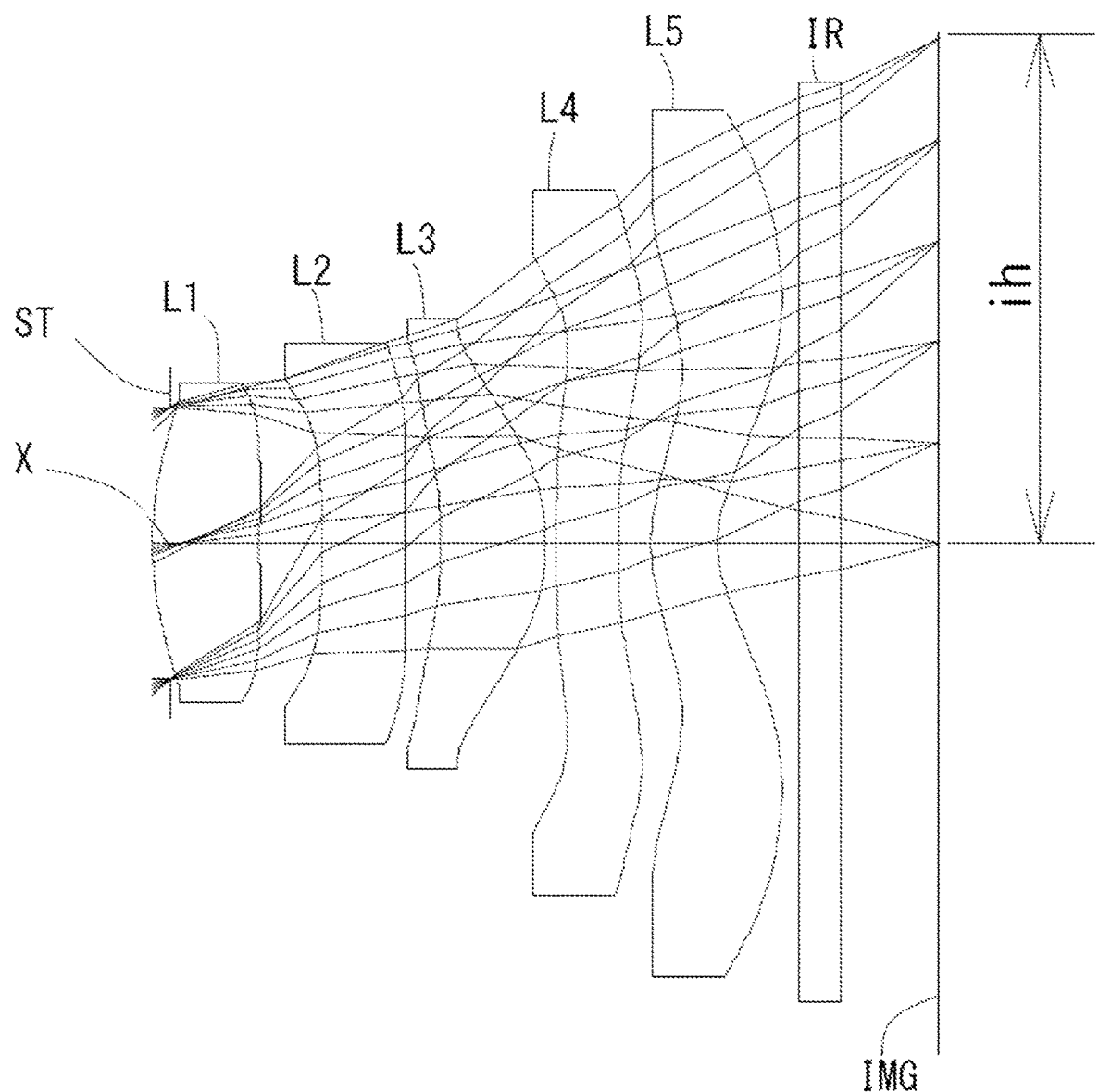
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4

Unit mm f = 2.72          ih = 2.52
Fno = 2.0         TTL = 3.84
ω(°) = 42.8

Surface Data

| Surface Number 1 (Object) | Curvature Radius r Infinity | Surface Distance d Infinity | Retractive Index Nd | Abbe Number vd |
|---|---|---|---|---|
| 1 (Stop) | Infinity | −0.0900 | | |
| 2* | 1.7376 | 0.5328 | 1.544 | 55.86 (vd1) |
| 3* | 16.3358 | 0.3115 | | |
| 4* | −13.5894 | 0.4168 | 1.671 | 19.48 (vd2) |
| 5* | 13.5325 | 0.1739 | | |
| 6* | −2.5258 | 0.5245 | 1.544 | 55.88 (vd3) |
| 7* | −0.9893 | 0.0490 | | |
| 8* | 48.3652 | 0.3085 | 1.671 | 19.48 (vd4) |
| 9* | 6.4951 | 0.1644 | | |
| 10* | 0.8953 | 0.3314 | 1.544 | 55.88 (vd5) |
| 11* | 0.6100 | 0.4000 | | |
| 12 | Infinity | 0.2100 | 1.563 | 51.30 |
| 13 | Infinity | 0.4897 | | |
| Image Plane | Infinliy | | | |

Constituent Lens Data

| Lens | Start Surface | Focal Length | | Composite Focal Leagth |
|---|---|---|---|---|
| 1 | 2 | 3.527 | f23 | 3.278 |
| 2 | 4 | −10.030 | | |
| 3 | 6 | 2.667 | | |
| 4 | 8 | −11.204 | | |
| 5 | 10 | −5.954 | | |

Aspheric Surface Data

| | Second Surface | Third Surface | Fourth Surface | Fifth Surface | Sixth Surface | Seventh Surface |
|---|---|---|---|---|---|---|
| k | 6.553111E−02 | 0.000000E+00 | 0.000000E+00 | 0.000000E+00 | 0.000000E+00 | −3.901457E+00 |
| A4 | −4.427761E−02 | −1.598998E−01 | −3.526594E−01 | −2.671446E−01 | −3.328307E−01 | −6.826472E−01 |
| A6 | 5.000608E−02 | −1.164471E−01 | 2.888965E−01 | 5.418567E−01 | 1.150235E+00 | 1.9073/8E+00 |
| A8 | −5.7151856E−01 | −7.438352E−02 | −1.647264E+00 | −1.343959E+00 | −5.473386E−01 | −3.580098E+00 |
| A10 | 1.1752806E+00 | −2.295903E−01 | 2.910761E+00 | 1.415509E+00 | −2.101248E+00 | 4.426664E+00 |
| A12 | −1.222332E+00 | 5.7601206E−01 | −1.099870E+00 | −7.6999056E−01 | 3.967655E+00 | −3.173502E+00 |
| A14 | −1.975582E−02 | −4.822176E−01 | −1.661425E−01 | 1.750000E−01 | −2.8723316E+00 | 1.145423E+00 |
| A16 | 0.000000E+00 | 0.000000E+00 | 0.000000E+00 | 0.000000E+00 | 7.826800E−01 | −1.475043E−01 |
| A18 | 0.000000E+00 | 0.000000E+00 | 0.000000E+00 | 0.0000006 +00 | 0.000000E+00 | 0.000000E+00 |
| A20 | 0.000000E+09 | 0.000000E+00 | 0.000000E+00 | 0.000000E+00 | 0.0000006+00 | 0.000000E+00 |

| | Eighth Surface | Ninth Surface | Tenth Surface | Eleventh Surface |
|---|---|---|---|---|
| k | −1.000000E+00 | 0.000000E+00 | −7.006044E+00 | −3.768665E+00 |
| A4 | 2.506039E−01 | 3.918706E−01 | −8.673810E−02 | −1.649996E−01 |
| A6 | −2.350321E−01 | −9.354420E−01 | −1.958156E−01 | 4.433314E−02 |
| A8 | −2.002311E−01 | 1.187182E+00 | 2.158591E−01 | 1.560209E−02 |
| A10 | 5.578664E−01 | −1.024875E+00 | −9.685480E−02 | −2.585796E−02 |
| A12 | −4.656494E−01 | 6.060998E−01 | 2.356347E−02 | 1.480278E−02 |
| A14 | 1.8464406E−01 | −2.436087E−01 | −3.115118E−03 | −4.883180E−03 |
| A16 | −2.764062E−02 | 6.407015E−02 | 1.808665E−04 | 8.269964E−04 |
| A18 | 0.000000E+00 | −9.8943616E−03 | 1.587829E−06 | −7.533516E−05 |
| A20 | 0.000000E+00 | 6.720242E−04 | −5.672567E−07 | 2.716481E−06 |

The imaging lens in Example 4 satisfies conditional expressions (1) to (17) as shown in Table 13.

Figure 8:
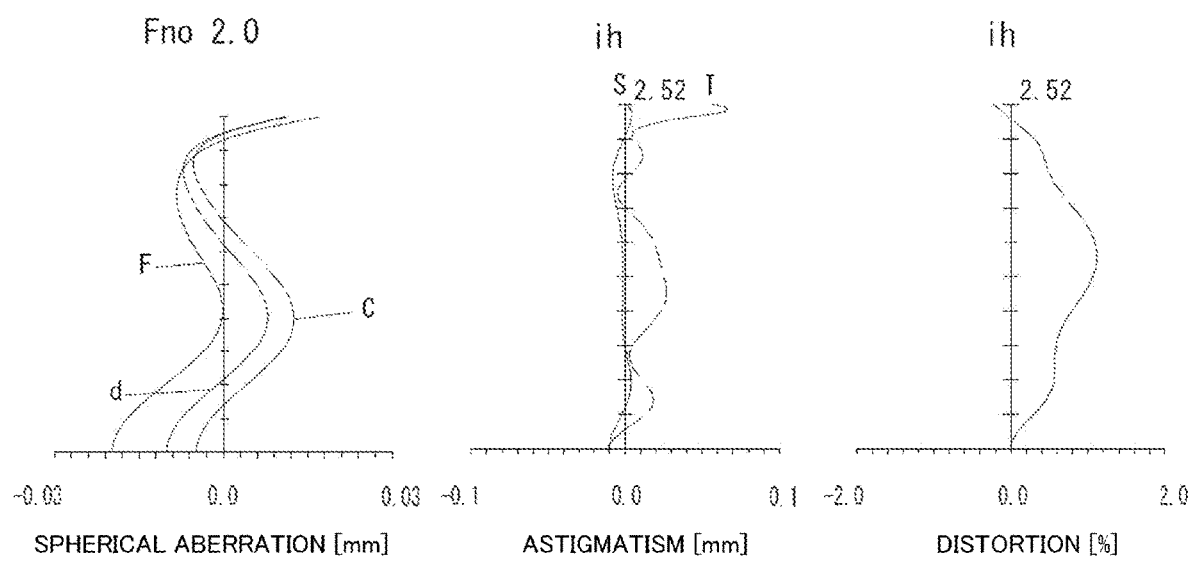
FIG. 8 shows spherical aberration, astigmatism, and distortion of the imaging lens in Example 4 according to the present invention.
Figure 9:
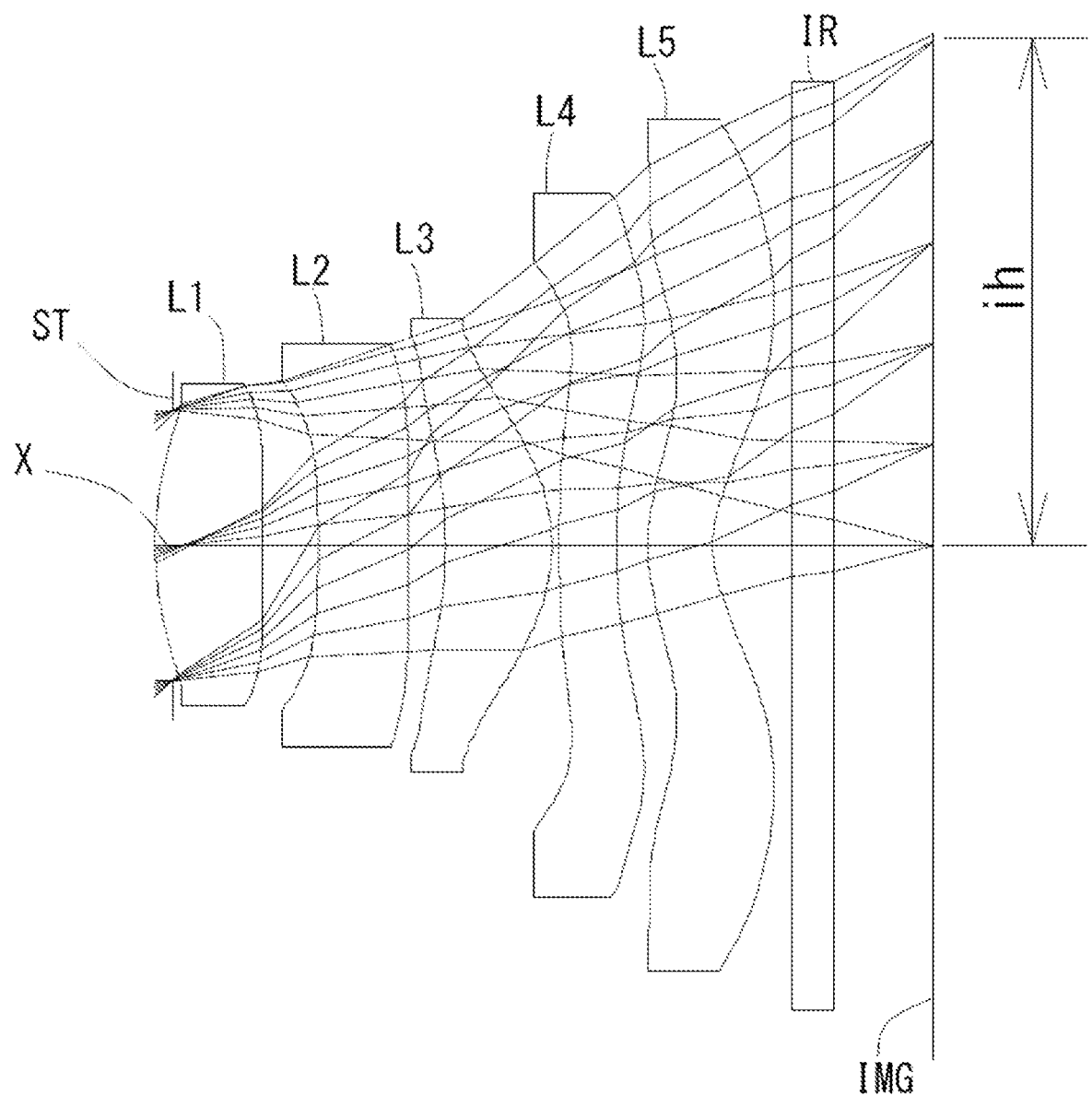
FIG. 9 is a schematic view showing a general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5

Unit mm f = 2.74  
Fno = 2.0  
ω(°) = 42.6  
ih = 2.52  
TTL = 3.86

Surface Data

| Surface Number 1 | Curvature Radius r | Surface Distance d | Retractive Index Nd | Abbe Number vd |
|---|---|---|---|---|
| (Object) | Infinity | Infinity | | |
| 1 (Stop) | Infinity | −0.0900 | | |
| 2* | 1.6927 | 0.5395 | 1.544 | 55.86 (vd1) |
| 3* | 12.0537 | 0.2835 | | |
| 4* | 13.6507 | 0.4570 | 1.671 | 19.46 (vd2) |
| 5* | 21.4204 | 0.1857 | | |
| 6* | −2.4585 | 0 5370 | 1.544 | 55.86 (vd3) |
| 7* | −0.9554 | 0.0400 | | |
| 8* | 38.8865 | 0.2901 | 1.671 | 15.48 (vd4) |
| 9* | 5.0499 | 0.1560 | | |
| 10* | 0.9112 | 0.3307 | 1.544 | 55.86 (vd5) |
| 11* | 0.6134 | 0.4000 | | |
| 12 | Infinity | 0.2100 | 1.563 | 51.30 |
| 13 | Infinity | 0.5004 | | |
| Image Plane | Infinity | | | |

Constituent Lens Data

| Lens | Start Surface | Focal Length | | Composite Focal leagth |
|---|---|---|---|---|
| 1 | 2 | 3.553 | f23 | 2.954 |
| 2 | 4 | −12.370 | | |
| 3 | 6 | 2.550 | | |
| 4 | 8 | −5.674 | | |
| 5 | 10 | −5.668 | | |

Aspheric Surface Data

| | Second Surface | Third Surface | Fourth Surface | Fifth Surface | Stxth Surface | Seventh Surface |
|---|---|---|---|---|---|---|
| k | 4.554692E−02 | 0.000000E+00 | 0.000000E+00 | 0.000000E+00 | 0.000000E+00 | −4.116605E+00 |
| A4 | −4.023647E−02 | −1.553471E−01 | −3.172611E−01 | −2.265600E−01 | −3.170714E−01 | −6.920753E−01 |
| A6 | 4.464759E−02 | −1.454521E−01 | 2.722919E−01 | 6.318125E−01 | 1.152585E+00 | 1.954753E+00 |
| A8 | −5.454725E−01 | −4.210982E−02 | −1.857749E+00 | −1.3505515E+00 | −5.521690E−01 | −3.604809E+00 |
| A10 | 1.177969E+00 | −2.339197E−01 | 2.618573E+00 | 1.4119595E+00 | −2.102190E+00 | 4.420714E+00 |
| A12 | −1.211958E+00 | 5.828682E−01 | −1.009870E+00 | −7.583562E−01 | 3.966881E+00 | −3.135972E+00 |
| A14 | 1.500962E−03 | −4.717218E−01 | −1.661425E−01 | 1.800000E−01 | −2.8723316E+00 | 1.120006E+00 |
| A16 | 0.000000E+00 | 0.000000E+00 | 0.000000E+00 | 0.000000E+00 | 7.826800E−01 | −1.440834E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | −1.0000005+00 | 0.0000006+00 | −7.448085E+00 | −3.873332E+00 |
| A4 | 2.500947E−01 | 3.882162E−01 | −8.2826576E−02 | −1.649996E−01 |
| A6 | −1.096226E−01 | −9.172442E−01 | −1.960592E−01 | 4.433314E−02 |
| A8 | −7.408894E−01 | 1.127193E+00 | 2.180321E−01 | 1.560209E−02 |
| A10 | 1.706956E+00 | −9.464.389E−01 | −9.690014E−02 | −2.565796E−02 |
| A12 | −2.006681E+00 | 5.470441E−01 | 2.354516E−02 | 1.480276E−02 |
| A14 | 1.4549815+00 | −2.148211E−01 | −3.117190E−03 | −4.683180E−03 |
| A16 | −6.613164E−01 | 5.492036E−02 | 1.612283E−04 | 8.2699645−04 |
| A18 | 1.735792E−01 | −8.191832E−03 | 1.602780E−06 | −7.533516E−05 |
| A20 | −1.994957E−02 | 5.344509E−04 | −5.628340E−07 | 2.716481E−06 |

The imaging lens in Example 5 satisfies conditional expressions (1) to (17) as shown in Table 13.

Figure 10:
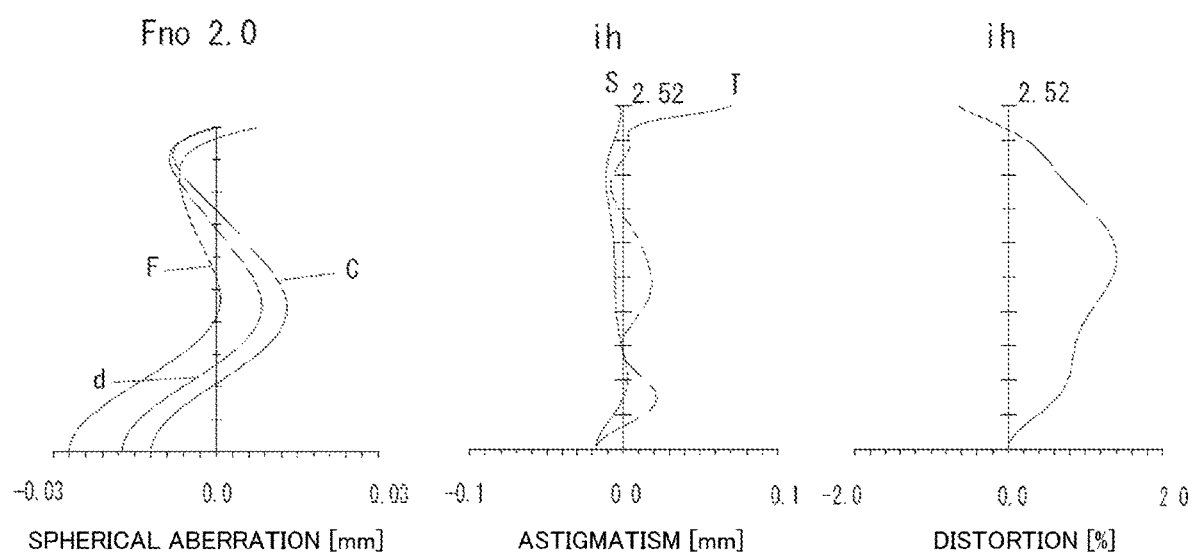
FIG. 10 shows spherical aberration, astigmatism, and distortion of the imaging lens in Example 5 according to the present invention.
Figure 11:
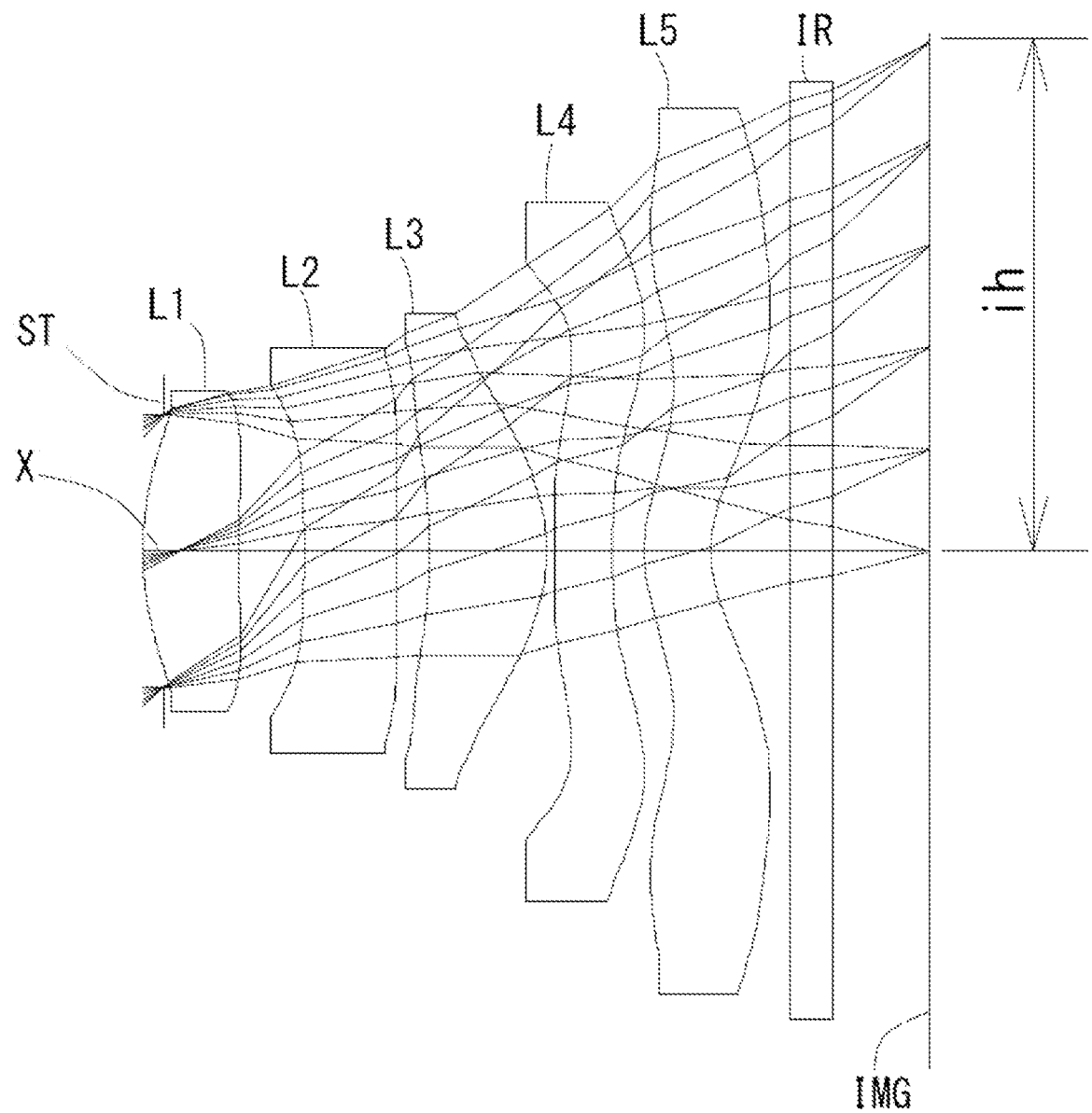
FIG. 11 is a schematic view showing the general configuration of an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

| Example 6 |
|---|

| Unit mm | |
|---|---|
| f = 2.74 | ih = 2.52 |
| Fno = 2.0 | TTL = 3.85 |
| ω(°) = 42.6 | |

| Surface Data | | | | |
|---|---|---|---|---|
| Surface Number 1 (Object) | Curvature Radius r Infinity | Surface Distance d Infinity | Retractive Index Nd | Abbe Number vd |
| 1 (Stop) | Infinity | −0.1050 | | |
| 2* | 1.5979 | 0.4792 | 1.544 | 55.86 (vd1) |
| 3* | 7.2010 | 0.3237 | | |
| 4* | −17.9495 | 0.4648 | 1.671 | 19.45 (vd2) |
| 5* | 11.8453 | 0.1616 | | |
| 6* | −3.4168 | 0.5849 | 1.544 | 55.86 (vd3) |
| 7* | −1.0271 | 0.0400 | | |
| 8* | 314.3216 | 0.2900 | 1.671 | 19.48 (vd4) |
| 9* | 5.3822 | 0.1595 | | |
| 10* | 0.8524 | 0.3300 | 1.544 | 55.85 (vd5) |
| 11* | 0.51364 | 0.4000 | | |
| 12 | Infinity | 0.2100 | 1.563 | 51.30 |
| 13 | Infinity | 0.4803 | | |
| Image Plane | Infinity | | | |

| Constituent Lens Data | | | | |
|---|---|---|---|---|
| Lens | Start Surface | Focal Length | | Composite Focal Leagth |
| 1 | 2 | 3.662 | f23 | 2.964 |
| 2 | 4 | −10.563 | | |
| 3 | 6 | 2.483 | | |
| 4 | 8 | −8.159 | | |
| 5 | 10 | −6.138 | | |

| Aspheric Surface Data | | | | | | |
|---|---|---|---|---|---|---|
| | Second Surface | Trite Surface | Fourth Surface | Filth Surface | Sixth Surface | Seventh Surface |
| k | 1.510600E−01 | 0.000000E+00 | 0.000000E+00 | 0.000000E+00 | 0.000000E+00 | −4.013323E+00 |
| A4 | −1.603102E−02 | −1.158776E−01 | −2.735528E−01 | −2.846293E−01 | −4.912862E−01 | −6.354776E−01 |
| A6 | −2.490167E−01 | −1.189313E−01 | 2.660931E−01 | 1.260027E+00 | 2.513346E+00 | 2.229363E+00 |
| A8 | 1.431427E+00 | −7.065170E−01 | −3.217792E+00 | −4.037836E+00 | −5.156302E+00 | −4.665262E+00 |
| A10 | −5.434699E+00 | 4.011197E+00 | 1.180330E+01 | 7.424801E+00 | 6.038367E+00 | 5.167060E+00 |
| A12 | 9.486761E+00 | −1.215968E+01 | −2.601340E+01 | −8.2251186E+00 | −3.965240E+00 | −3.838331E+00 |
| A14 | 4.714228E+00 | 1.719658E+01 | 3.152555E+01 | 4.934667E+00 | 1.122387E+00 | 1.205911E+00 |
| A16 | 0.000000E+00 | −9.279303E+00 | −1.492522E−01 | −1.172221E+00 | −1.900000E−02 | −1.228021E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | −1.000000E+00 | −1.000000E+00 | −6.903890E+00 | −3.838949E+00 |
| A4 | 4.064007E−01 | 5.120812E−01 | −1.102754E−01 | −1.553627E−01 |
| A6 | −1.740639E−01 | −9.384543E−01 | −1.780394E−01 | 5.092792E−02 |
| A8 | −1.153493E+00 | 7.437067E−01 | 1.470280E−01 | −4.639330E−03 |
| A10 | 2.492257E+00 | −3.033219E−01 | 1.009499E−02 | 1.243888E−02 |
| A12 | −2.702735E+00 | 2.812884E−02 | −4.683970E−02 | −1.316018E−02 |
| A14 | 1.824901E+00 | 3.083676E−02 | 2.312655E−02 | 5.085282E−03 |
| A16 | −7.842765E−01 | −1.459951E−02 | −5.221225E−03 | −1.438885E−03 |
| A18 | 1.964154E−01 | 2.762246E−03 | 6.035201E−04 | 1.793947E−04 |
| A20 | −2.154769E−02 | −2.028857E−04 | −2.895362E−05 | −9.132620E−06 |

The imaging lens in Example 6 satisfies conditional expressions (1) to (17) as shown in Table 13.

Figure 12:
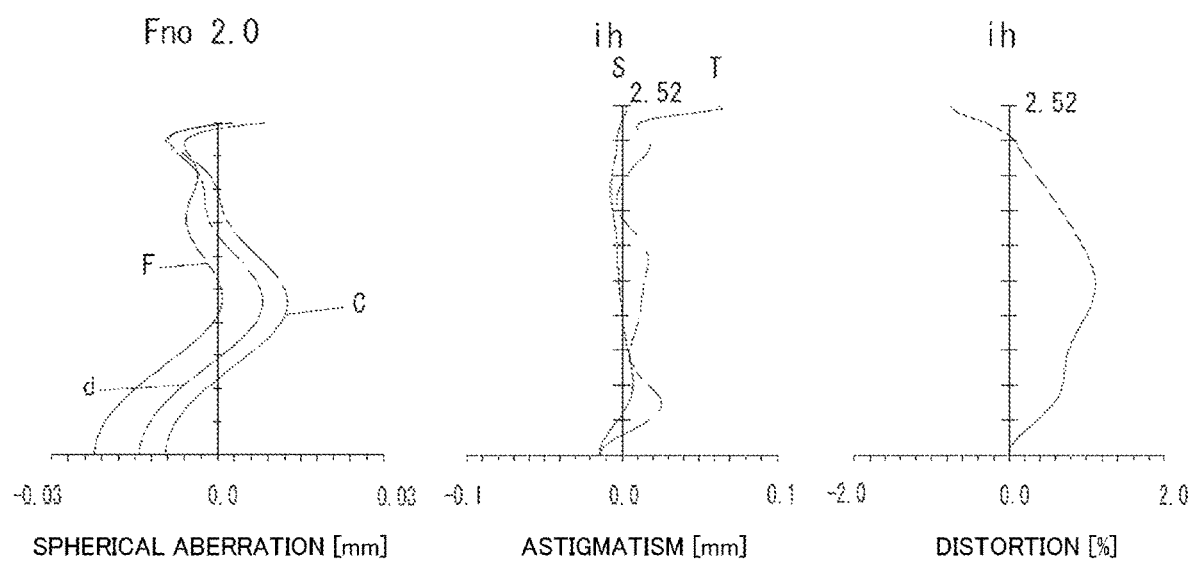
FIG. 12 shows spherical aberration, astigmatism, and distortion of the imaging lens in Example 6 according to the present invention.
Figure 13:
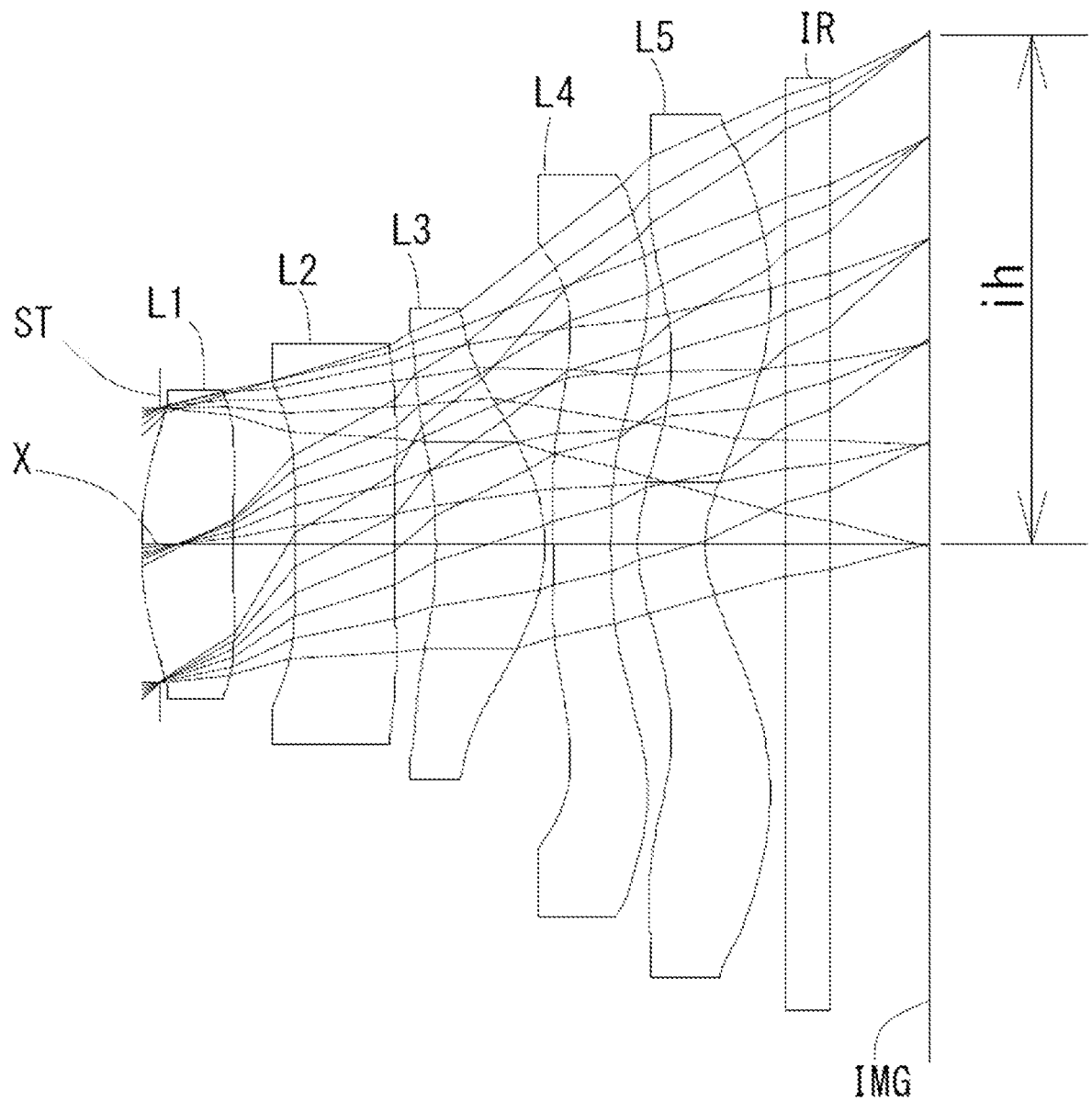
FIG. 13 is a schematic view showing the general configuration of an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

| Example 7 |
|---|
| Unit mm | f = 2.71  ih = 2.52
Fno = 2.0  TTL = 3.81
ω(°) = 42.9

Surface Data

| Surface Number 1 (Object) | Curvature Radius r Infinity | Surface Distance d Infinity | Retractive Index Nd | Abbe Number vd |
|---|---|---|---|---|
| 1 (Stop) | Infinity | −0.0950 | | |
| 2* | 1.6724 | 0.4550 | 1.544 | 55.86 (vd1) |
| 3* | 8.7444 | 0.3066 | | |
| 4* | −253.0982 | 0.4906 | 1.671 | 19.46 (vd2) |
| 5* | 9.9397 | 0.2051 | | |
| 6* | −2.6698 | 0.8358 | 1.544 | 55.36 (vd3) |
| 7* | −1.0251 | 0.0400 | | |
| 8* | 124.4341 | 0.2900 | 1.671 | 19.48 (vd4) |
| 9* | 6.0557 | 0.1316 | | |
| 10* | 0.8383 | 0.3328 | 1.544 | 55.86 (vd5) |
| 11* | 0.5732 | 0.4000 | | |
| 12 | Infinity | 0.2100 | 1.563 | 51.30 |
| 13 | Infinity | 0.4927 | | |
| Image Plane | Infinity | | | |

Constituent Lens Data

| Lens | Start Surface | Focal Length | | Composite Focal Length |
|---|---|---|---|---|
| 1 | 2 | 3.715 | f23 | 3.183 |
| 2 | 4 | −14.235 | | |
| 3 | 6 | 2.733 | | |
| 4 | 8 | −10.965 | | |
| 5 | 10 | −5.975 | | |

Aspheric Surface Date

| | Second Surface | Third Surface | Fourth Surface | Fifth Surface | Sixth Surface | Seventh Surface |
|---|---|---|---|---|---|---|
| k | −3.755696E−02 | 0.000000E+00 | 0.000000E+00 | 0.000090E+00 | 0.000000E+00 | −4.087451E+00 |
| A4 | −4.131582E−02 | −1.617101E−01 | −2.306330E−01 | −1.897078E−01 | −4.244173E−01 | −8.814107E−01 |
| A6 | −9.189661E−02 | −9.221979E−02 | −9.827946E−02 | 7.388353E−01 | 1.928457E+00 | 2.930723E+00 |
| A8 | 3.727793E−01 | −2.918887E−01 | −3.576451E−01 | −2.341751E+00 | −2.989726E+00 | −5.513796E+00 |
| A10 | −2.119682E+00 | 5.419414E−01 | 4.912319E−02 | 4.081449E+00 | 1.973645E+00 | 6.262532E+00 |
| A12 | 3.906751E+00 | −6.9010326−01 | 1.831949E+00 | −4.2009256+00 | 2.897096E−01 | −3.575267E+00 |
| A14 | −2.617468E+00 | 4.277638E−01 | −1.377653E+00 | 2.397464E+00 | −1.141152E+00 | 1.126391E+00 |
| A16 | 0.000000E+00 | 0.000000E+00 | 0.000000E+00 | −5.530000E−01 | 4.394464E−01 | 4.017946E−01 |
| A18 | 0.000000E+00 | 0.009000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | −1.000000E+00 | −1.0000006+00 | −8.000000E+00 | −4.151051E+00 |
| A4 | 2.141300E−01 | 4.887466E−01 | −5.711763E−02 | −1.464052E−01 |
| A6 | 3.752468E−01 | −9.059473E−01 | −1.546945E−01 | 4.391342E−02 |
| A8 | −1.941442E+00 | 8.978682E−01 | 1.472532E−01 | −1.073980E−04 |
| A10 | 3.252609E+00 | −6.100293E−01 | −5.829026E−02 | −9.749319E−03 |
| A12 | −3.151299E+00 | 2.910922E−01 | 1.292138E−02 | 6.233130E−03 |
| A14 | 1.914899E+00 | −9.579877E−02 | −1.702983E−03 | −1.899741E−03 |
| A16 | −7.195584E−01 | 2.063067E−02 | 1.185895E−04 | 2.973693E−04 |
| A18 | 1.528619E−01 | −2.5897216−03 | −6.704529E−08 | −2.218127E−05 |
| A20 | −1.394639E−02 | 1.414980E−04 | −5.171992E−07 | 6.031059E−07 |

The imaging lens in Example 7 satisfies conditional expressions (1) to (17) as shown in Table 13.

Figure 14:
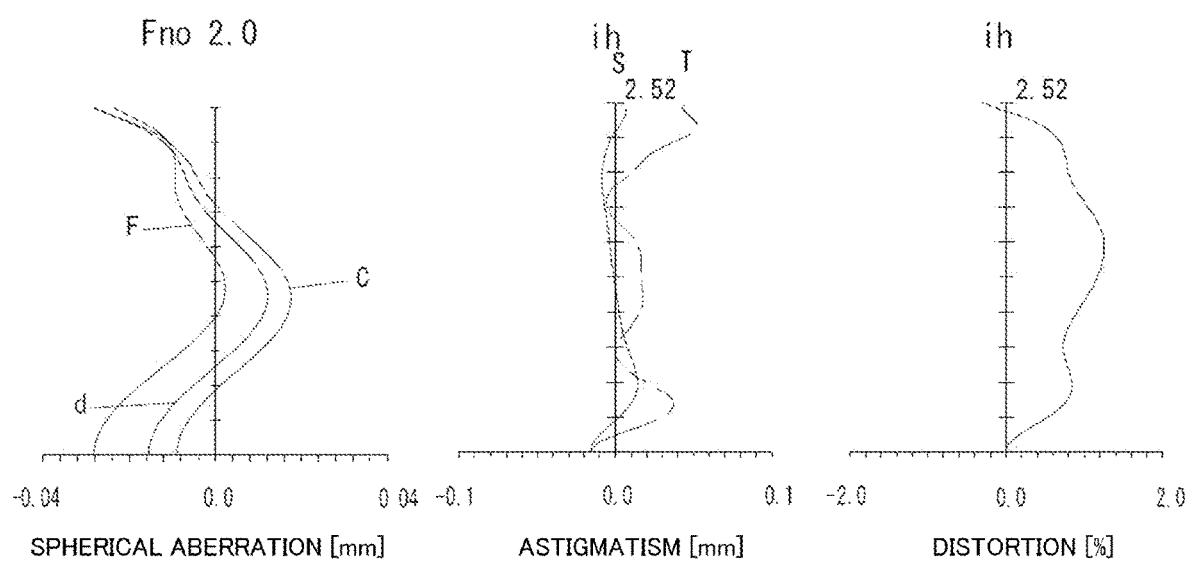
FIG. 14 shows spherical aberration, astigmatism, and distortion of the imaging lens in Example 7 according to the present invention.
Figure 15:
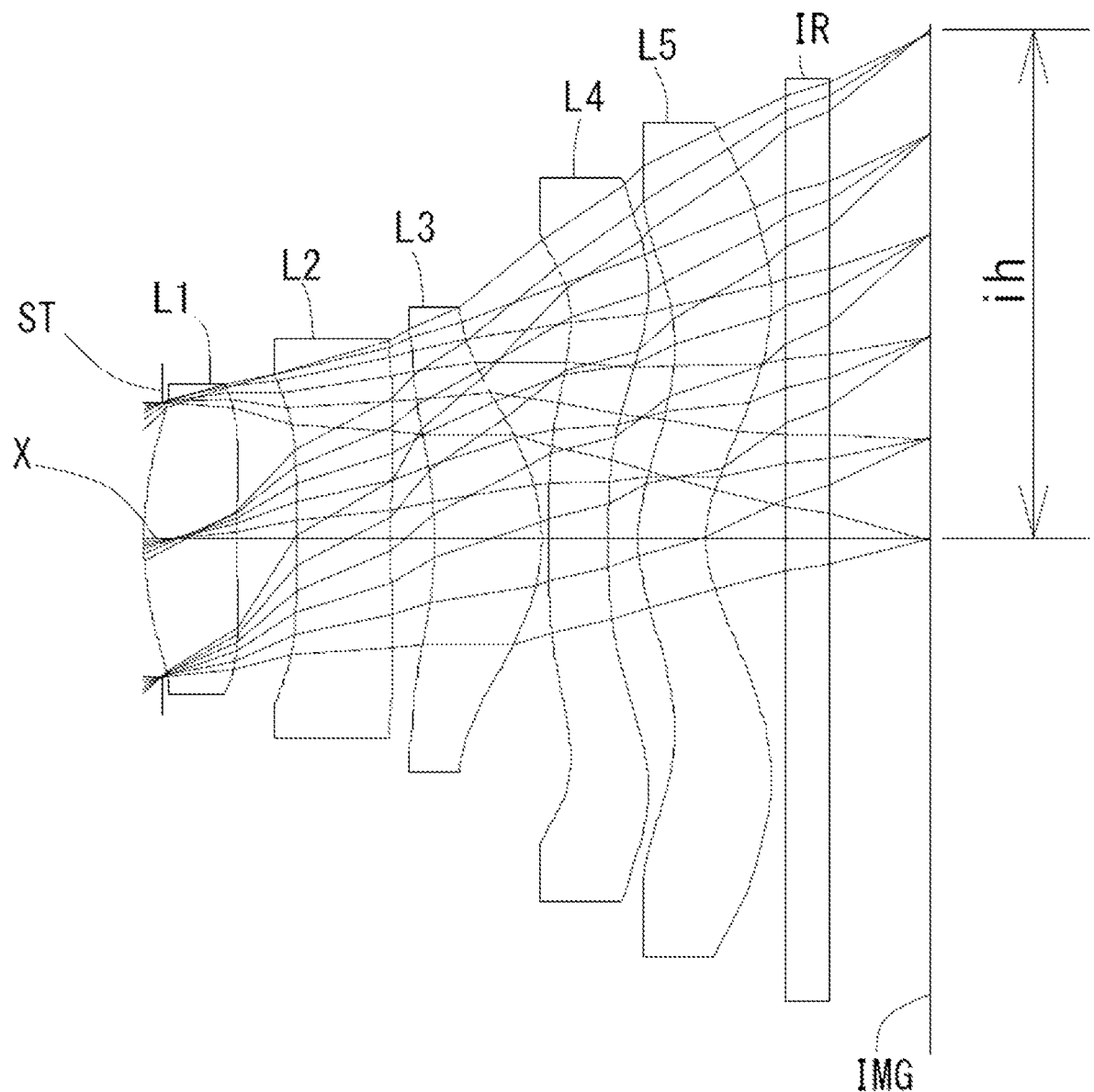
FIG. 15 is a schematic view showing a general configuration of an imaging lens in Example 8 according to the present invention.

FIG. 14 shows spherical aberration (mm), astigmatism (mm), and distortion (%) of the imaging lens in Example 7. As shown in FIG. 14, each aberration is corrected excellently.

Example 8

The basic lens data is shown below in Table 8.

TABLE 8

| Example 8 |
|---|

| Unit mm | |
|---|---|
| f = 2.71 | ih = 2.52 |
| Fno = 2.0 | TTL = 3.82 |
| ω(°) = 42.8 | |

| Surface Data | | | | |
|---|---|---|---|---|
| Surface Number 1 (Object) | Curvature Radius r Infinity | Surface Distance d Infinity | Retractive Index Nd | Abbe Number νd |
| 1 (Stop) | Infinity | −0.0900 | | |
| 2* | 1.7167 | 0.4565 | 1.544 | 55.86 (vd1) |
| 3* | 8.2904 | 0.2938 | | |
| 4* | 22.7571 | 0.4714 | 1.671 | 19.46 (vd2) |
| 5* | 8.2608 | 0.2135 | | |
| 6* | −2.5369 | 0.5292 | 1.544 | 55.86 (vd3) |
| 7* | −1.0258 | 0.0400 | | |
| 8* | −48.9127 | 0.2900 | 1.671 | 19.48 (vd4) |
| 9* | 8.9759 | 0.1468 | | |
| 10* | 0.8455 | 0.3340 | 1.544 | 55.86 (vd5) |
| 11* | 0.5836 | 0.4000 | | |
| 12 | Infinity | 0.2100 | 1.563 | 51.30 |
| 13 | Infinity | 0.5028 | | |
| Image Plane | Infinity | | | |

| Constituent Lens Data | | | | |
|---|---|---|---|---|
| Lens | Start Surface | Fecal Length | | Composite Focal Length |
| 1 | 2 | 3.888 | f23 | 3.184 |
| 2 | 4 | −19.577 | | |
| 3 | 6 | 2.817 | | |
| 4 | 8 | −11.274 | | |
| 5 | 10 | −6.291 | | |

| Aspheric Surface Data | | | | | | |
|---|---|---|---|---|---|---|
| | Second Surface | Third Surface | Fourth Surface | Fifth Surface | Sixth Surface | Seventh Surface |
| k | 2.731420E−03 | 0.000000E+00 | 0.000000E+00 | 0.000000E+00 | 0.000000E+00 | −4.408546E+00 |
| A4 | −5.539204E−02 | −1.780576E−01 | −2.268938E−01 | −1.832438E−01 | −4.414198E−01 | −8.641750E−01 |
| A6 | −4.566846E−02 | −1.346538E−01 | −1.333223E−01 | 7.345695E−02 | 2.041873E+00 | 2.855922E+00 |
| A8 | 2.489861E−01 | −1.496236E−01 | −3.514482E−01 | −2.344614E+00 | −3.232041E+00 | −5.491596E+00 |
| A10 | −2.016995E+00 | 4.208135E−01 | 7.479592E−02 | 4.080322E+00 | 2.452802E+00 | 6.472237E+00 |
| A12 | 3.903262E+00 | −8.375887E−01 | 1.831957E+00 | −4.201488E+00 | −3.563543E−01 | −4.192830E+00 |
| A14 | −2.623111E+00 | 6.815158E−01 | −1.377654E+00 | 2.397463E+00 | −7.215245E−01 | 1.289398E+00 |
| A16 | 0.000000E+00 | 0.000000E+00 | 0.000000E+00 | −6.520000E−01 | 3.421980E−01 | −1.262332E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |
| | Eighth Surface | Ninth Surface | Tenth Surface | Eleventh Surface | | |
| k | −1.000000E+00 | −1.000000E+00 | −7.008728E+00 | −3.871457E+00 | | |
| A4 | 2.890478E−01 | 5.239752E−01 | −7.543724E−02 | −1.684883E−01 | | |
| A6 | 2.984369E−01 | −8.500708E−01 | −9.414323E−02 | 1.009791E−01 | | |
| A8 | −1.980346E+00 | 7.416953E−01 | 7.965884E−02 | −6.93674E−02 | | |
| A10 | 3.520568E+00 | −4.502991E−01 | −2.607378E−02 | 6.334875E−02 | | |
| A12 | −3.589300E+00 | 1.983116E−01 | 4.613373E−03 | −3.408121E−02 | | |
| A14 | 2.295521E+00 | −6.311169E−02 | −5.330891E−04 | 1.270408E−02 | | |
| A16 | −9.072964E−01 | 1.363414E−02 | 3.310372E−05 | −2.994257E−03 | | |
| A18 | 2.019169E−01 | −1.720905E−03 | 8.475984E−07 | 3.901472E−04 | | |
| A20 | −1.925764E−02 | 9.110647E−05 | −5.494399E−07 | −2.112400E−05 | | |

The imaging lens in Example 8 satisfies conditional expressions (1) to (17) as shown in Table 13.

Figure 16:
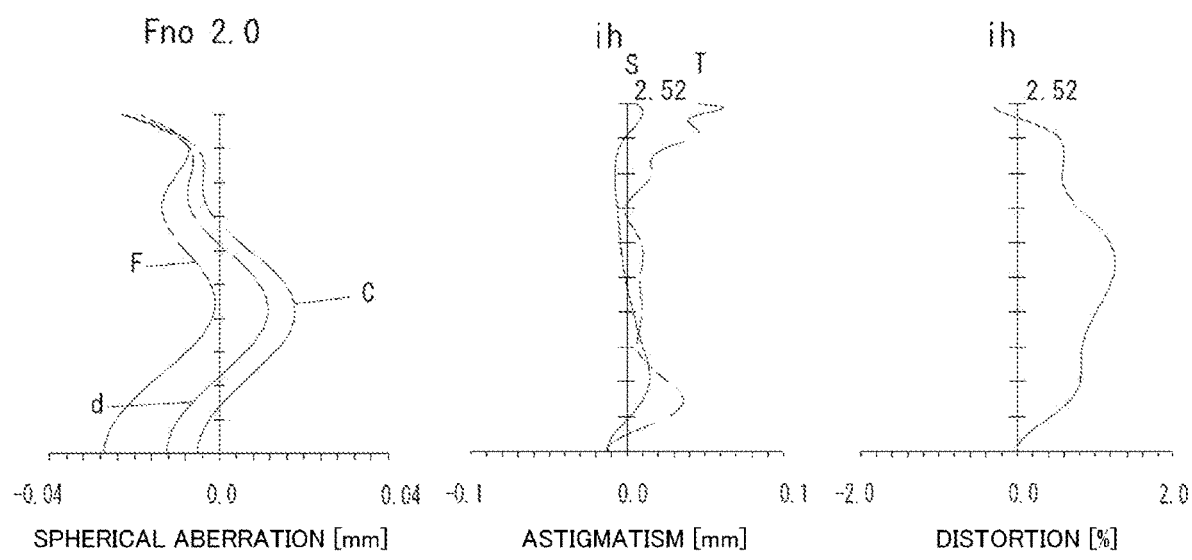
FIG. 16 shows spherical aberration, astigmatism, and distortion of the imaging lens in Example 8 according to the present invention.
Figure 17:
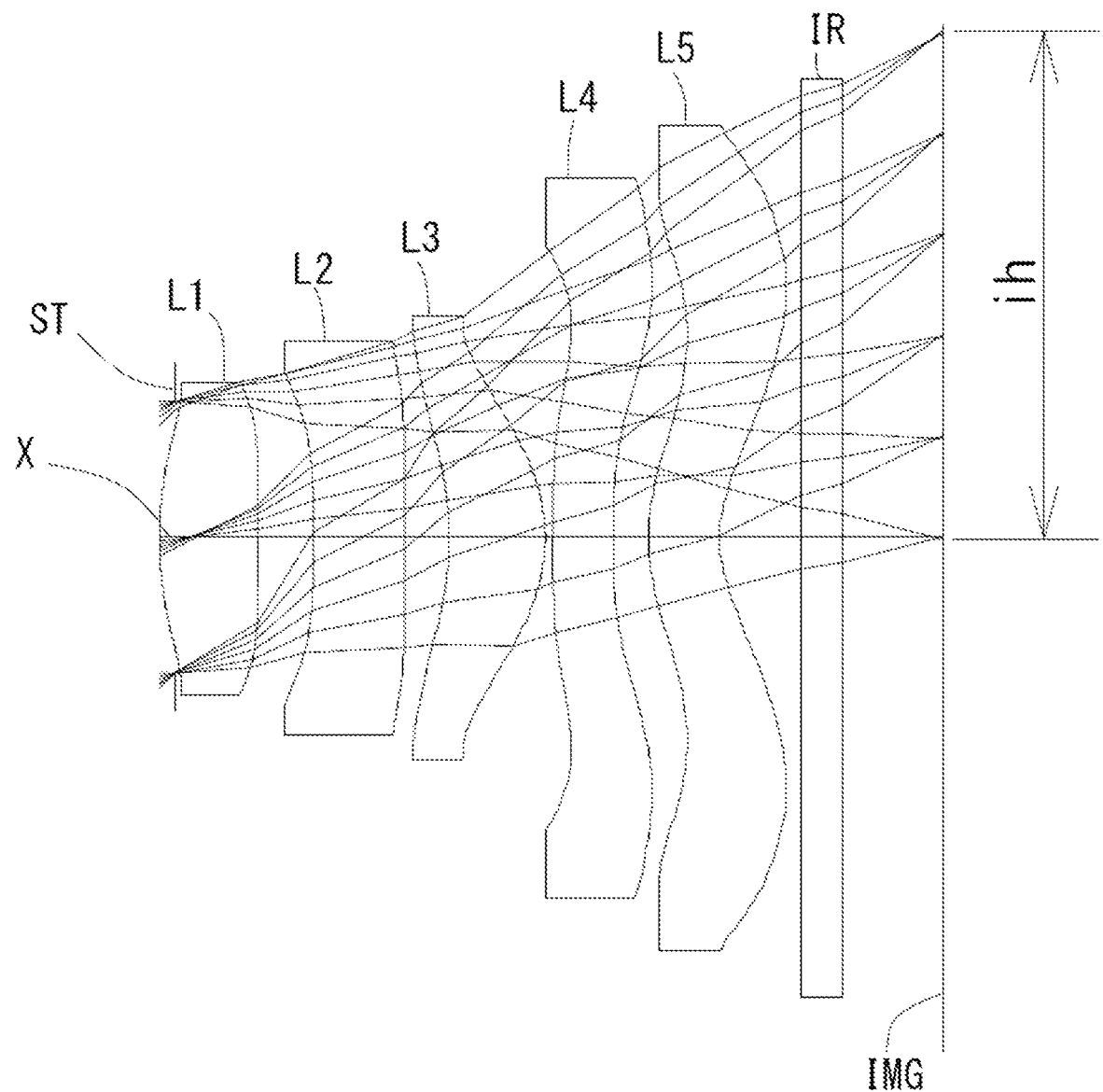
FIG. 17 is a schematic view showing the general configuration of an imaging lens in Example 9 according to the present invention.

FIG. 16 shows spherical aberration (mm), astigmatism (mm), and distortion (%) of the imaging lens in Example 8. As shown in FIG. 16, each aberration is corrected excellently.

Example 9

The basic lens data is shown below in Table 9.

TABLE 9

Example 9

Unit mm f = 2.71  ih = 2.52
Fno = 2.0  TTL = 3.81
ω(°) = 42.9

Surface Data

| Surface Number 1 (Object) | Curvature Radius r Infinity | Surface Distance d Infinity | Retractive Index Nd | Abbe Number vd |
|---|---|---|---|---|
| 1 (Stop) | Infinity | −0.0800 | | |
| 2* | 1.8393 | 0.4910 | 1.544 | 55.88 (vd1) |
| 3* | 42.2174 | 0.2725 | | |
| 4* | −13.1165 | 0.4562 | 1.671 | 19.48 (vd2) |
| 5* | 112.5904 | 0.2159 | | |
| 6* | −1.9588 | 0.4783 | 1.544 | 55.88 (vd3) |
| 7* | −0.9296 | 0.0400 | | |
| 8* | −444.2837 | 0.2951 | 1.671 | 1945 (vd4) |
| 9* | 5.0907 | 0.1751 | | |
| 10* | 0.8953 | 0 3535 | 1.544 | 55.88 (vd5) |
| 11* | 0.6301 | 0.4000 | | |
| 12 | Infinity | 0.2100 | 1.563 | 51.30 |
| 13 | infinity | 0.5000 | | |
| Image Plane | Infinity | | | |

Constituent Lens Data

| Lens | Start Surface | Fecal Length | | Composite Focal Length |
|---|---|---|---|---|
| 1 | 2 | 3.518 | f23 | 3.107 |
| 2 | 4 | −17.473 | | |
| 3 | 8 | 2.784 | | |
| 4 | 8 | −7.495 | | |
| 5 | 10 | −7.327 | | |

Aspheric Surface Data

| | Second Surface | Third Surface | Fourth Surface | Fifth Surface | Sixth Surface | Seventh Surface |
|---|---|---|---|---|---|---|
| k | −9.204559E−02 | 0.000000E+00 | 0.000000E+00 | 0.000000E+00 | 0.000000E+00 | −4.035841E+00 |
| A4 | −1.564626E−02 | −1.562376E−01 | −2.684890E−01 | −1.374818E−01 | −3.861989E−01 | −7.972456E−01 |
| A6 | −5.214121E−01 | −4.424907E−01 | 1.672586E−01 | 2.784691E−01 | 1.471973E+00 | 2.444824E+00 |
| A8 | 2.694854E+05 | 1.056756E+00 | −1.850478E+00 | −1.6607195−01 | −8.344788E−01 | −4.626644E+00 |
| A10 | −5.735526E+00 | −1.914628E+00 | 4.130525+00 | −1.188001E+00 | −2.119737E+00 | 6.8657486+00 |
| A12 | 1.317145E+01 | 1.519736E+00 | −3.354240E+00 | 2.517356E+00 | 3.659822E+00 | −6.217169E+00 |
| A14 | −7.915878E+00 | −2.495858E−01 | 9.031632E−01 | −1.889493E+00 | −2.145629E+00 | 3.123140E+00 |
| A16 | 0.000000E+00 | 0.000000E+00 | 0.000000E+00 | 5.115864E−01 | 4.400000E−01 | −6.489229E−01 |
| A18 | 0.000000E+00 | 0.000000E+00 | 0.000000E+00 | 0.000000E+00 | 0.0000006+00 | 0.0000006+00 |
| A20 | 0.000000E+00 | 0.000000E+00 | 0.000000E+00 | 0.000000E+00 | 0.000000E+00 | 0.0000006+00 |

| | Eighth Surface | Ninth Surface | Tenth Surface | Eleventh Surface |
|---|---|---|---|---|
| k | −1.0000006+00 | −1.000000E+00 | −7.814773E+00 | −4.215417E+00 |
| A4 | 3.2185976−01 | 4.100462E−01 | −1.563817E−02 | −1.212109E−01 |
| A6 | −1.567230E−01 | −7.601103E−01 | −1.433332E−01 | 6.087596E−02 |
| A8 | −6.515253E−01 | 7.302985E−01 | 1.220402E−01 | −6.181264E−02 |
| A10 | 1.378568E+00 | −4.642058E−01 | −5.689401E−02 | 5.875773E−02 |
| A12 | −1.379367E+00 | 1.997368E−01 | 1.655441E−02 | −3.5261856E02 |
| A14 | 8.151323E−01 | −8.057709E−02 | −2.384485E−03 | 1.371394E−02 |
| A16 | −2.952960E−01 | 1.256556E−02 | 3.654850E−05 | −3.1513845−03 |
| A18 | 6.106071E−02 | −1.740896E−03 | 1.999760E−05 | 3.867536E−04 |
| A20 | −5.637794E−03 | 1.156375E−04 | −4.722141E−07 | −1.935422E−05 |

The imaging lens in Example 9 satisfies conditional expressions (1) to (17) as shown in Table 13.

Figure 18:
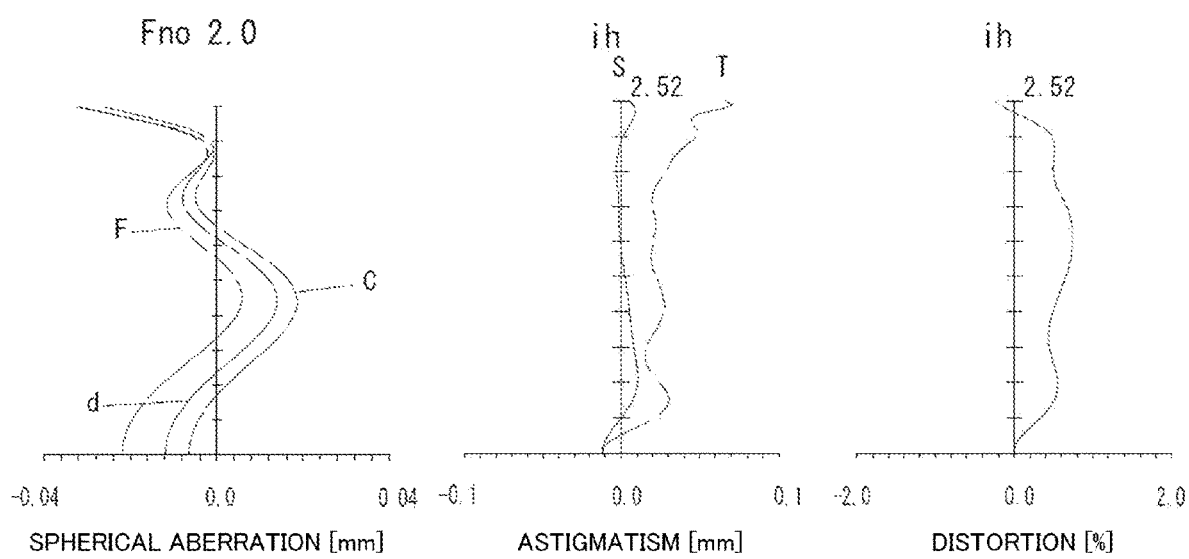
FIG. 18 shows spherical aberration, astigmatism, and distortion of the imaging lens in Example 9 according to the present invention.
Figure 19:
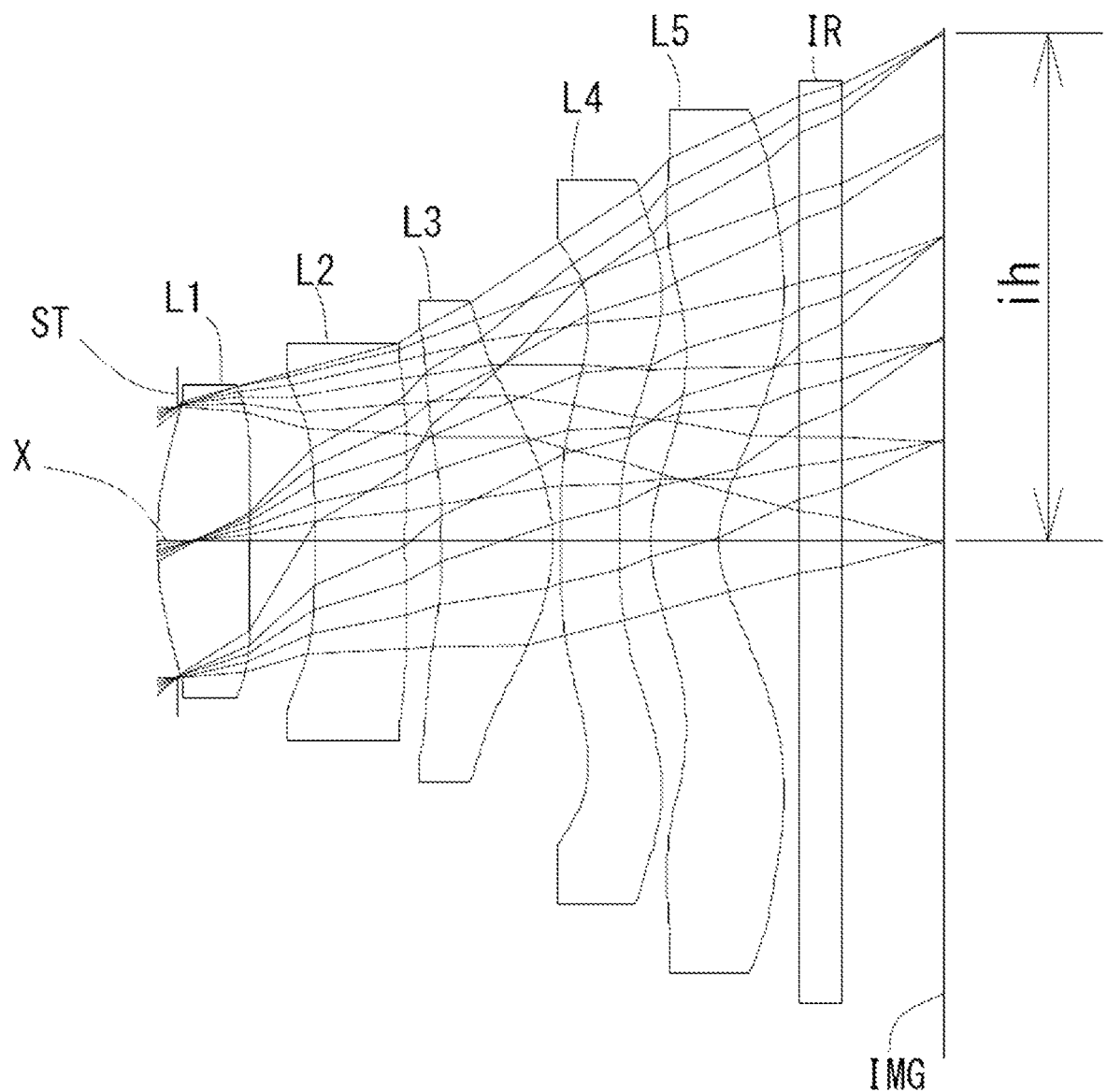
FIG. 19 is a schematic view showing the general configuration of an imaging lens in Example 10 according to the present invention.

FIG. 18 shows spherical aberration (mm), astigmatism (mm), and distortion (%) of the imaging lens in Example 9. As shown in FIG. 18, each aberration is corrected excellently.

Example 10

The basic lens data is shown below in Table 10.

TABLE 10

Example 10

Unit mm f = 2.72  ih = 2.52
Fno = 2.0  TTL = 3.83
ω(°) = 42.7

Surface Data

| Surface Number (Object) | Curvature Radius r | Surface Distance d | Retractive Index Nd | Abbe Number vd |
|---|---|---|---|---|
| 1 | Infinity | Infinity | | |
| 1 (Stop) | Infinity | −0.0950 | | |
| 2* | 1.7031 | 0.4564 | 1.544 | 55.86 (vd1) |
| 3* | 11.5488 | 0.3246 | | |
| 4* | −17.7923 | 0.4480 | 1.671 | 19.46 (vd2) |
| 5* | 10.6754 | 0.1636 | | |
| 6* | −3.1948 | 0.5473 | 1.544 | 55.86 (vd3) |
| 7* | −1.0995 | 0.0400 | | |
| 8* | 18.4071 | 0.2900 | 1.671 | 10.48 (vd4) |
| 9* | 5.2048 | 0.1570 | | |
| 10* | 0.8265 | 0.3401 | 1.544 | 55.86 (vd5) |
| 11* | 0.5676 | 0.4000 | | |
| 12 | Infinity | 0.2100 | 1.567 | 51.30 |
| 13 | Infinity | 0.5062 | | |
| Image Plane | Infinity | | | |

Constituent Lens Data

| Lens | Start Surface | Focal Length | | Composite Focal length |
|---|---|---|---|---|
| 1 | 2 | 3.611 | f23 | 3.555 |
| 2 | 4 | −9.876 | | |
| 3 | 6 | 2.620 | | |
| 4 | 8 | −10.687 | | |
| 5 | 10 | −7.499 | | |

Aspheric Surface Data

| | Second Surface | Third Surface | Fourth Surface | Fifth Surface | Sixth Surface | Seventh Surface |
|---|---|---|---|---|---|---|
| k | −7.782410E−02 | 0.000000E+00 | 0.000000E+00 | 0.000000E+00 | 0.000000E+00 | −4.258590E+00 |
| 14 | 6.102860E−03 | −1.144022E−01 | −2.570528E−01 | −2.410747E−01 | −4.912377E−01 | −6.622362E−01 |
| 16 | −7.522543E−01 | −5.5743815−01 | −6.839806E−02 | 9.891942E−01 | 2.670212E+00 | 2.277913E+00 |
| A8 | 4.354767E+00 | 1.802260E+00 | −5.444681E−01 | −3.092845E+00 | −5.503754E+00 | −4.538836E+00 |
| A10 | −1.425905E+01 | −4.127938E+00 | 6.162567E−01 | 5.116262E+00 | 6.213471E+00 | 5.663698E+00 |
| 412 | 2.171446E+01 | 4.2640326+00 | 1.428407E+00 | −4.826749E+00 | −3.840166E+00 | −4.060501E+00 |
| 414 | −1.291841E−01 | −1.446817E+00 | −1.323981E−00 | 2.508490E+00 | 1.084248E+00 | 1.508191E+00 |
| 416 | 0.000000E+00 | 0.000000E+00 | 0.000000E+00 | −5.150000E−01 | −7.028625E−02 | −2.241548E−01 |
| 119 | 0.000000E+00 | 0.000000E+00 | 0.000000E+00 | 0.000000E+00 | 0.000000E+00 | 0.000000E+00 |
| 120 | 0.000000E+00 | 0.0000005+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | −1.000000E+00 | −1.0000005+00 | −5.881437E+00 | −3.754975E+00 |
| 44 | 4.503842E−01 | 5.732420E−01 | −1.561572E−01 | −1.9892085−01 |
| 46 | −3.766646E−01 | −1.042674E+00 | 3.384452E−02 | 1.368849E−01 |
| A8 | −6.032633E−01 | 9.344059E−01 | −6.022825E−02 | −1.092691E−01 |
| 110 | 1.659893E+00 | −5.296813E−01 | 8.993799E−02 | 7.374370E−02 |
| 412- | −1.875037E+00 | 1.949350E−01 | −3.153056E−02 | −3.376591E−02 |
| 414 | 1.2560755+00 | −4.488789E−02 | 6.765992E−03 | 9.965922E−03 |
| 116 | −5.162269E−01 | 5.575951E−03 | −6.869177E−04 | −1.808989E−03 |
| 418 | 1.198274E−01 | −1.614946E04 | 2.792672E−05 | 1.822522E−04 |
| A20 | −1.195111E−02 | −2.585506E−05 | −5.050714E−07 | −7.746905E−06 |

The imaging lens in Example 10 satisfies conditional expressions (1) to (17) as shown in Table 13.

Figure 20:
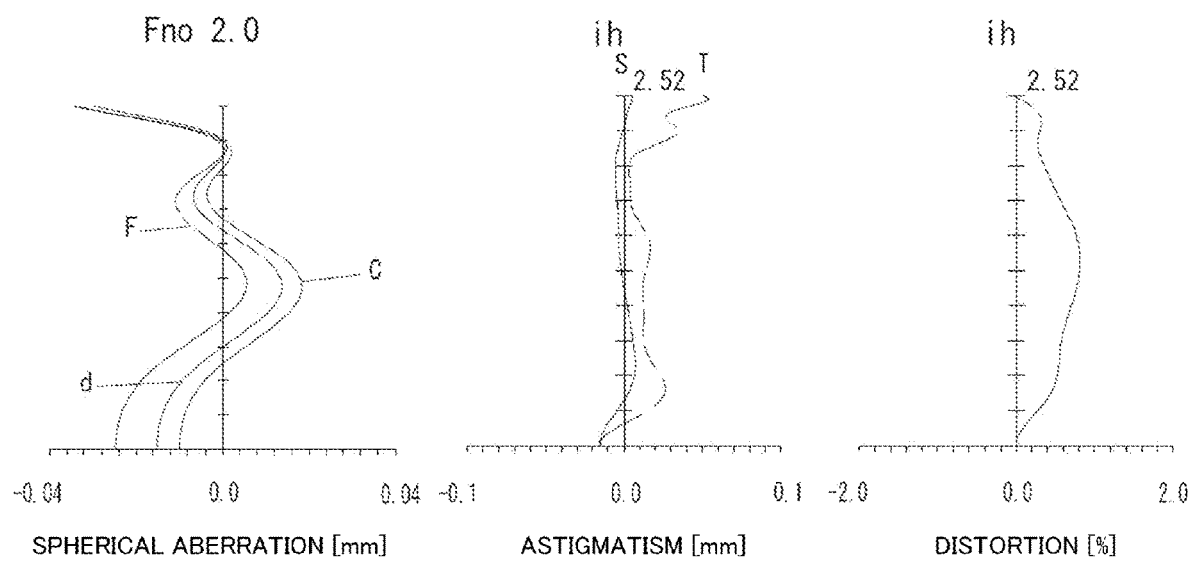
FIG. 20 shows spherical aberration, astigmatism, and distortion of the imaging lens in Example 10 according to the present invention.
Figure 21:
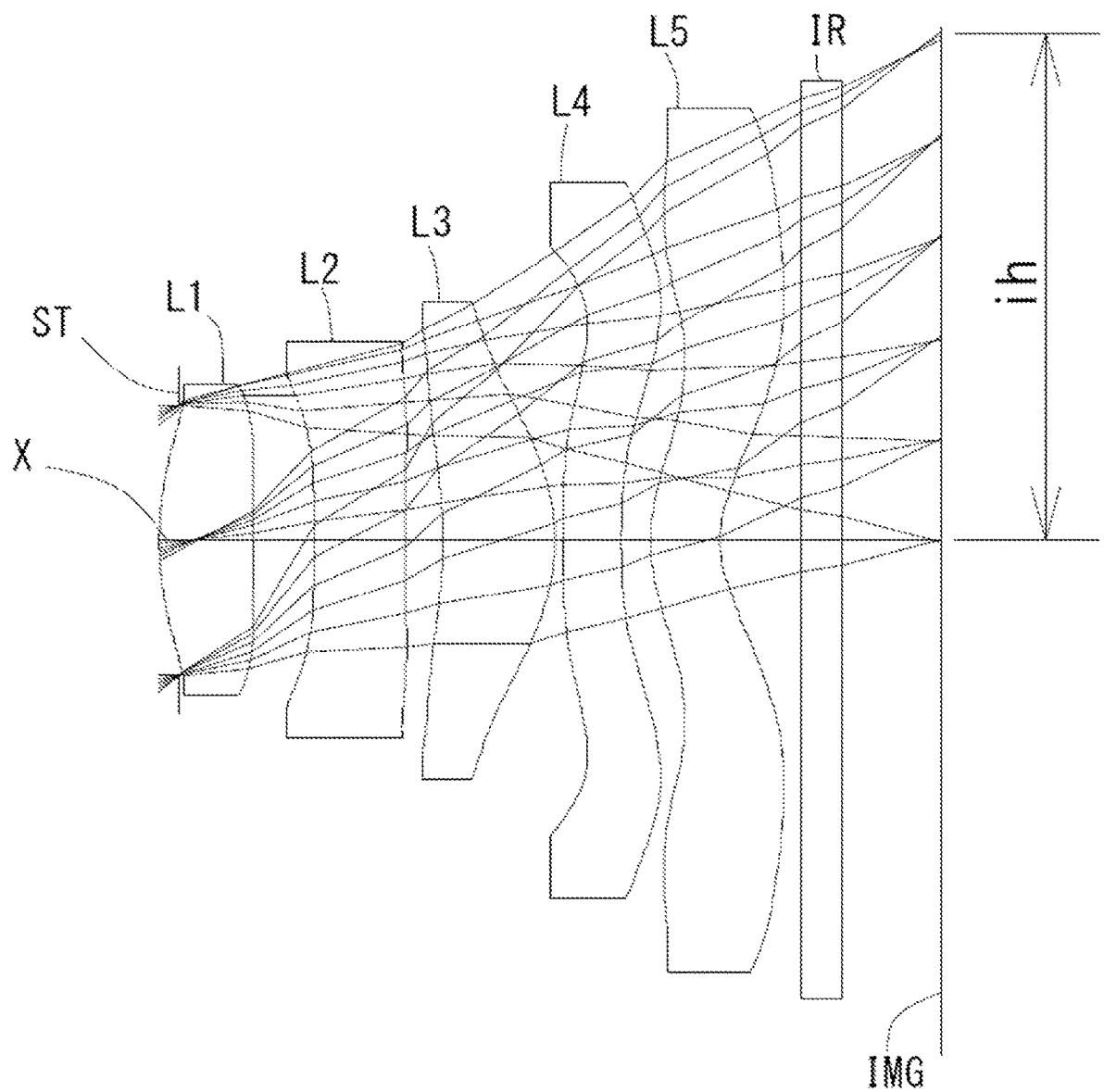
FIG. 21 is a schematic view showing the general configuration of an imaging lens in Example 11 according to the present invention.

FIG. 20 shows spherical aberration (mm), astigmatism (mm), and distortion (%) of the imaging lens in Example 10. As shown in FIG. 20, each aberration is corrected excellently.

Example 11

The basic lens data is shown below in Table 11.

TABLE 11

Example 11

Unit mm f = 2.71  ih = 2.52
Fno = 2.0  TTL = 3.82
ω(°) = 42.8

Surface Data

| Surface Number (Object) | Curvature Radius r | Surface Distance d | Retractive Index Nd | Abbe Number vd |
|---|---|---|---|---|
| 1 | Infinity | Infinity | | |
| 1 (Stop) | Infinity | −0.0950 | | |
| 2* | 1.6999 | 0.4646 | 1.544 | 55.86 (vd1) |
| 3* | 12.2927 | 0.3077 | | |
| 4* | −20.6045 | 0.4519 | 1.661 | 20,37 (vd2) |
| 5* | 9.4498 | 0.1848 | | |
| 6* | −3.3219 | 0.0615 | 1.544 | 55.86 (v43) |
| 7* | −1.0756 | 0.0400 | | |
| 8* | 182.8993 | 0.2900 | 1.661 | 20.37 (vd4) |
| 9* | 5.7935 | 0.1439 | | |
| 10* | 0.8292 | 0.3481 | 1.544 | 55.86 (vd5) |
| 11* | 0.5863 | 0.4000 | | |
| 12 | Infinity | 0.2100 | 1.563 | 51.30 |
| 13 | Infinity | 0.4893 | | |
| Image Plane | Infinity | | | |

Constituent Lens Data

| Lens | Start Surface | Focal Length | | Composite Focal Length |
|---|---|---|---|---|
| 1 | 2 | 3.569 | f23 | 3.346 |
| 2 | 4 | −9.740 | | |
| 3 | 6 | 2.6136 | | |
| 4 | 8 | −9.055 | | |
| 5 | 10 | −7.428 | | |

Aspheric Surface Data

| | Second Surface | Third Surface | Fourth Surface | Fifth Surface | Sixth Surface | Seventh Surface |
|---|---|---|---|---|---|---|
| k | −1.000000E−01 | 0.000330E+00 | 0.000000E+00 | 0.000000E+00 | 0.000000E+00 | −4.288285E+00 |
| A4 | 4.487368E−03 | −1.208985E−01 | −2.535558E−01 | −2.014571E−01 | −4.213956E−01 | −6.281415E−01 |
| A6 | −7.627724E−01 | −5.827388E−01 | −1.506173E−01 | 7.644941E−01 | 2.298047E+00 | 2.112584E+00 |
| A8 | 4.542540E+00 | 1.880193E+00 | −2.974262E−01 | −2.316713E+00 | −4.487963E+00 | −4.072307E+00 |
| A10 | −1.498714E+01 | −4.262584E+00 | 2.010188E−01 | 3.552819E+00 | 4.557601E+00 | 4.877551E+00 |
| A12 | 2.310008E+01 | 4.4803156+00 | 1.823208E+00 | −2.9864155+00 | −2.334505E+00 | −3.338439E+00 |
| A14 | −1.390185E+01 | −1.6052376+00 | −1.479394E+00 | 1.353185E+00 | 3.447189E−01 | 1.171971E+00 |
| A16 | 0.000000E+00 | 0.000000E+00 | 0.000000E+00 | 2.304963E−01 | 7.700000E−02 | −1.614541E−01 |
| A16 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | −1.000000E+00 | −1.0000006+00 | −5.297003E+00 | −3.595400E+00 |
| A4 | 4.711497E−01 | 5.521735E−01 | −2.431896E−01 | −2.454296E−01 |
| A6 | −3.725131E−01 | −9.564449E−01 | 2.340035E−01 | 2.327965E−01 |
| A8 | −6.573323E−01 | 8.142902E−01 | −3.518862E−01 | −2.282225E−01 |
| A10 | 1.828345E+00 | −4.020149E−01 | 3.254861E−01 | 1.626511E−01 |
| A12 | −2.201203E+00 | 1.709711E−01 | −1.667088E−01 | −7.425972E−02 |
| A14 | 1.602404E+00 | −4.286578E−02 | 5.047455E−02 | 2.136954E−02 |
| A16 | −7.184750E−01 | 6.339711E−03 | −0.173007E−03 | −3.758939E−03 |
| A18 | 1.810201E−01 | −3.520243E−04 | 9.393813E−04 | 3.685097E−04 |
| A20 | −1.943473E−02 | −1.539000E−05 | −4.222426E−05 | −1.538780E−05 |

The imaging lens in Example 11 satisfies conditional expressions (1) to (17) as shown in Table 13.

Figure 22:
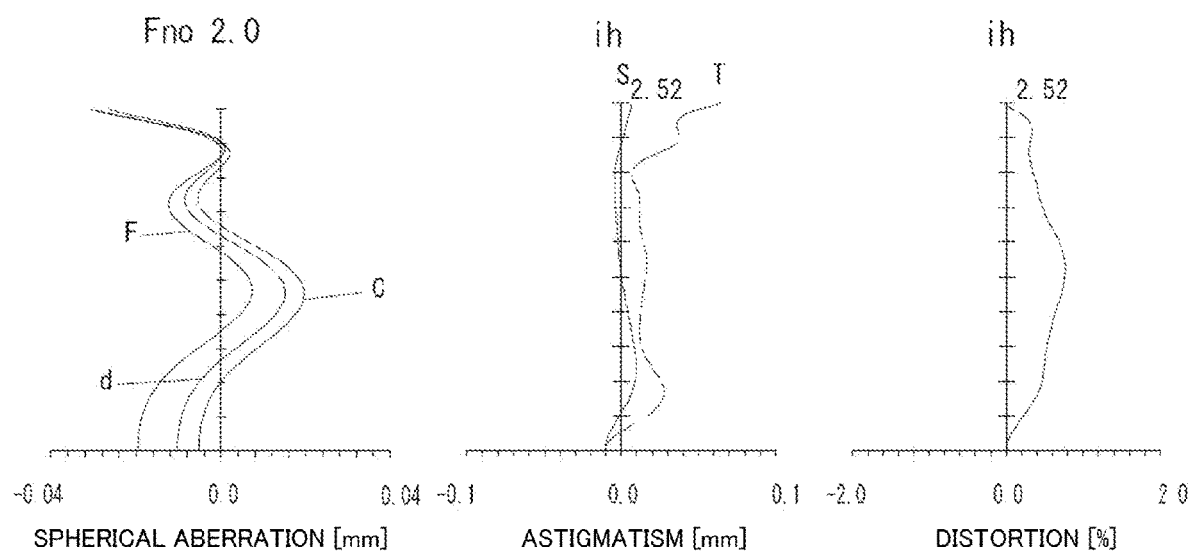
FIG. 22 shows spherical aberration, astigmatism, and distortion of the imaging lens in Example 11 according to the present invention.
Figure 23:
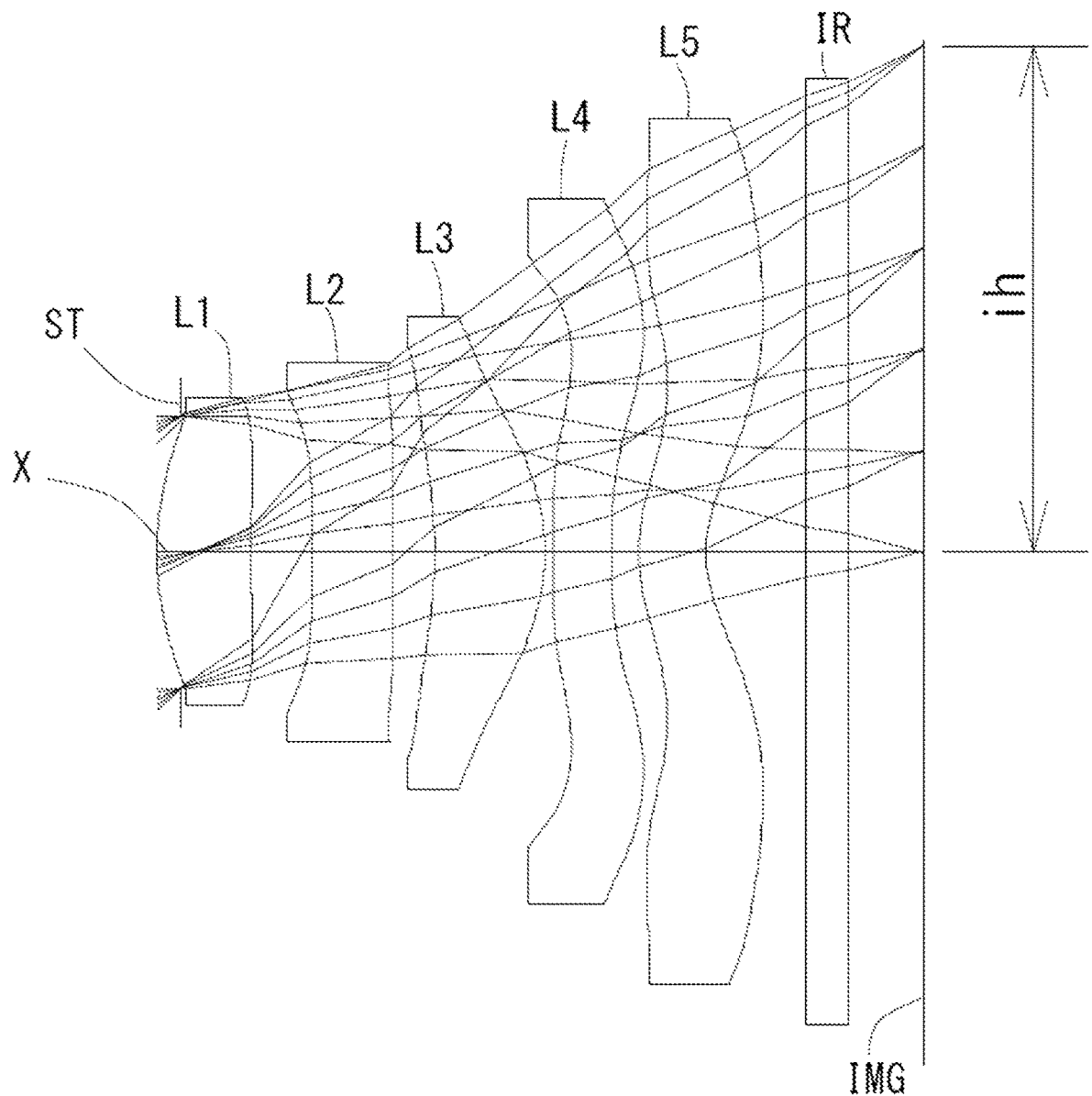
FIG. 23 is a schematic view showing the general configuration of an imaging lens in Example 12 according to the present invention.

FIG. 22 shows spherical aberration (mm), astigmatism (mm), and distortion (%) of the imaging lens in Example 11. As shown in FIG. 22, each aberration is corrected excellently.

Example 12

The basic lens data is shown below in Table 12.

TABLE 12

| Example 12 |
|---|

| Unit mm | | |
|---|---|---|
| f = 2.72 | | ih = 2.52 |
| Fno = 2.0 | | TTL = 3.74 |
| ω(°) = 42.7 | | |

| Surface Data | | | | |
|---|---|---|---|---|
| Surface Number (Object) | Curvature Radius r Infinity | Surface Distance d Infinity | Retractive Index Nd | Abbe Number vd |
| 1 (Stop) | Infinity | −0.1160 | | |
| 2* | 1.5553 | 0.4676 | 1.544 | 55.86 (vd1) |
| 3* | 7.7198 | 0.3089 | | |
| 4* | −19.2164 | 0.3959 | 1.671 | 19.49 (vd2) |
| 5* | 14.6569 | 0.2072 | | |
| 6* | −3.1075 | 0.5503 | 1.544 | 55.86 (vd3) |
| 7* | −1.0614 | 0.0400 | | |
| 8* | −71.1038 | 0.2900 | 1.671 | 19.48 (vd4) |
| 9* | 7.2428 | 0.1350 | | |
| 10* | 0.8761 | 0.3310 | 1.544 | 55.86 (vd5) |
| 11* | 0.5919 | 0.5000 | | |
| 12 | Infinity | 0.2100 | 1.563 | 51.30 |
| 13 | Infinity | 0.3755 | | |
| Image Plane | Infinity | | | |

| Constituent Lens Data | | | | |
|---|---|---|---|---|
| Lens | Start Surface | Focal Length | | Composite Focal Length |
| 1 | 2 | 3.485 | f23 | 3.198 |
| 2 | 4 | −12.327 | | |
| 3 | 6. | 2.705 | | |
| 4 | 8 | −9.776 | | |
| 5 | 10 | −5.683 | | |

| Aspheric Surface Data | | | | | | |
|---|---|---|---|---|---|---|
| | Second Surface | Third Surface | Fourth Surface | Fifth Surface | Sixth Surface | Seventh Surface |
| k | 6.712271E−01 | 0.000000E+00 | 0.000000E+00 | 0.000000E+00 | 0.000000E+00 | −3.624018E+00 |
| A4 | −2.826142E−02 | −8.344434E−02 | −2.589091E−01 | −2.189842E−01 | −4.096661E−01 | −4.119760E−01 |
| A6 | 4.381873E−01 | −6.200138E−01 | 6.219977E−03 | 9.233039E−01 | 2.317097E+00 | 1.350275E+00 |
| A8 | 2.398997E+00 | 2.011527E+00 | −7.645834E−01 | −3.294713E+00 | −5.1312208E+00 | −2.566499E+00 |
| A10 | −7.8795540+00 | 4.697799E+00 | 4.877592E−01 | 6.276956E+05 | 5.329554E+00 | 2.897257E+00 |
| A12 | 1.155553E+01 | 4.891433E+00 | 2.242216E+00 | −6.886154E+00 | 4.359073E+00 | −1.672684E+00 |
| A14 | −6.844923E+00 | −1.735176E+00 | −1.880684E+00 | 4.272659E+00 | 1.461595E+00 | 3.825434E−01 |
| A16 | 0.000000E+00 | 0.000000E+00 | 0.000000E+00 | −1.000000E+00 | −1.557365E−01 | 4.159682E−03 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | −1.000000E+00 | −1.005000E+00 | −4.637090E+00 | −3.513701E+00 |
| A4 | 6.305075E−01 | 6.698946E−01 | 4.414791E−01 | −3.670736E−01 |
| A6 | −1.084897E+00 | −1.391112E+00 | −6.340044E−01 | 4.760173E−01 |
| A8 | 7.759152E−01 | 1.534471E+00 | −8.780010E−01 | −5.215584E−01 |
| A10 | 1.577039E−03 | −1.183322E+00 | 7.958539E−01 | 3.919862E−01 |
| A12 | −6.667858E−01 | 6.426570E−01 | 4.365305E−01 | −1.883124E−01 |
| A14 | 7.596714E−01 | −2.324188E−01 | 1.473012E−01 | 5.681129E−02 |
| A18 | −4.249814E−01 | 5.161134E−02 | −3.020435E−02 | −1.0403925E−02 |
| A18 | 1.214883E−01 | −6.167989E−03 | 3.472520E−03 | 1.055448E−03 |
| A20 | −1.401314E−02 | 2.901685E−04 | −1.723520E−04 | −4.545024E−05 |

The imaging lens in Example 12 satisfies conditional expressions (1) to (17) as shown in Table 13.

Figure 24:
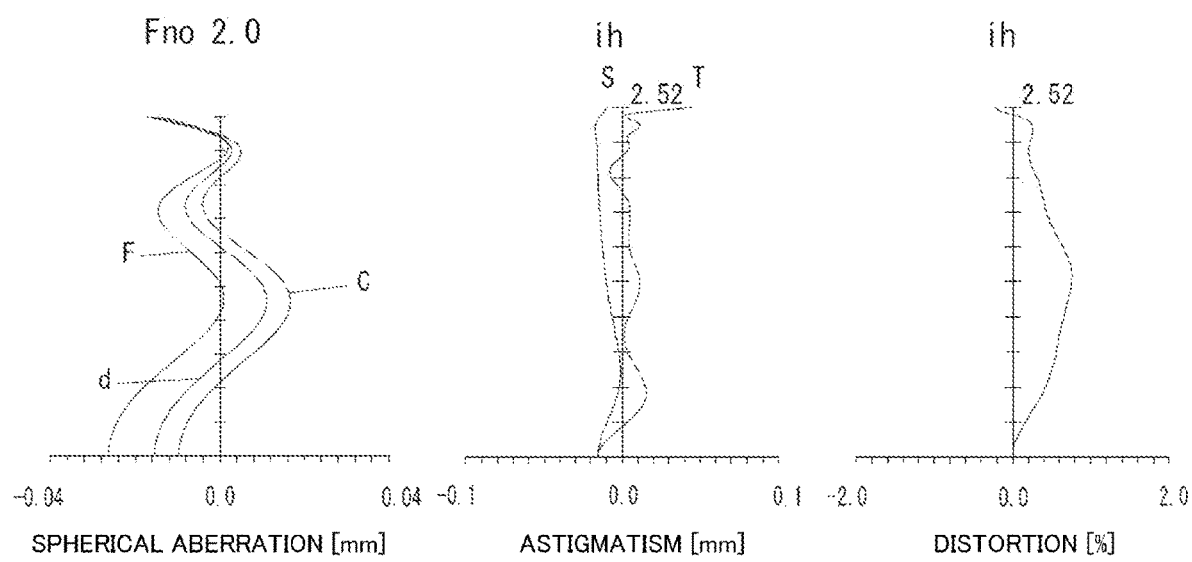
FIG. 24 shows spherical aberration, astigmatism, and distortion of the imaging lens in Example 12 according to the present invention.

FIG. 24 shows spherical aberration (mm), astigmatism (mm), and distortion (%) of the imaging lens in Example 12. As shown in FIG. 24, each aberration is corrected excellently.

In table 13, values of conditional expressions (1) to (17) related to the Examples 1 to 12 are shown.

TABLE 13

| Conditional expression | Example 1 | Example 2 | Example 3 | Example 4 | Example 5 | Example 6 |
|---|---|---|---|---|---|---|
| (1) vd4/vd5 | 0.36 | 0.35 | 0.35 | 0.35 | 0.35 | 0.35 |
| (2) T1/T2 | 2.37 | 1.25 | 1.30 | 1.79 | 1.52 | 2.00 |
| (3) \|r7\|/r8 | 6.97 | 7.04 | 2.02 | 7.45 | 7.70 | 58.40 |
| (4) (T1/f) × 100 | 9.75 | 9.21 | 9.84 | 11,44 | 10.36 | 11.79 |
| (5) \|r7\|/f | 16.63 | 19.19 | 3.23 | 17.77 | 14.21 | 114.53 |
| (6) (T3/f) × 100 | 1.49 | 1.49 | 1.56 | 1.80 | 1,46 | 1,46 |
| (7) T2/T3 | 2.75 | 4.92 | 4.87 | 3.55 | 4.67 | 4.04 |
| (8) D4/D5 | 0.95 | 0.94 | 0.88 | 0.93 | 0.88 | 0.88 |
| (9) r6/f | −0.28 | −0.34 | −0.36 | −0.36 | −0.35 | −0.37 |
| (10) (D3/f3) × 100 | 33.29 | 21.24 | 18.20 | 19.87 | 21.06 | 23.55 |
| (11) f3/f | 0.70 | 0.89 | 0.99 | 0.98 | 0.93 | 0.90 |
| (12) f2/f3 | −4.65 | −4.89 | −4.16 | −3.76 | −4.85 | −4.25 |
| (13) f3/f5 | −0.72 | −0.57 | −0.60 | −0.45 | −0.45 | −0.40 |
| (14) r8/f | 2.78 | 2.73 | 1.60 | 2.39 | 1.85 | 1.96 |
| (15) f4/f | −3.60 | −3.55 | −4.86 | −4.12 | −3.17 | −2.97 |
| (16) f23/f | 0.79 | 1.02 | 1.18 | 1.20 | 1.08 | 1.08 |
| (17) f1/f3 | 1.59 | 1.40 | 1.27 | 1.32 | 1.39 | 1.47 |

| Conditional expression | Example 7 | Example 8 | Example 9 | Example 10 | Example 11 | Example 12 |
|---|---|---|---|---|---|---|
| (1) vd4/vd5 | 0.35 | 0.35 | 0.35 | 0.35 | 0.38 | 0.35 |
| (2) T1/T2 | 1.49 | 1.37 | 1.26 | 1.77 | 1.66 | 1.49 |
| (3) \|r7\|/r8 | 17.89 | 5.45 | 87.27 | 3.55 | 31.57 | 9.82 |
| (4) (T1/f) × 100 | 11.32 | 10.83 | 10.06 | 11.94 | 11.35 | 11.35 |
| (5) \|r7\|/f | 45.95 | 18.62 | 164.04 | 6.86 | 67.47 | 26.13 |
| (6) (T3/f) × 100 | 1.48 | 1.47 | 1.48 | 1.47 | 1.48 | 1.47 |
| (7) T2/T3 | 5.13 | 5.35 | 5.40 | 4.59 | 4.62 | 5.18 |
| (8) D4/D5 | 0.87 | 0.87 | 0.83 | 0.85 | 0.83 | 0.88 |
| (9) r6/f | −0.38 | −0.38 | −0.34 | −0.40 | −0.40 | −0.39 |
| (10) (D3/f3) × 100 | 19.61 | 18.78 | 17.18 | 19.41 | 20.91 | 20.34 |
| (11) f3/f | 1.01 | 1.04 | 1.03 | 1.04 | 0.99 | 0.99 |
| (12) f2/f3 | −5.21 | −6.95 | −6.26 | −3.60 | −3.83 | −4.56 |
| (13) f3/f5 | −0.46 | −0.45 | −6.38 | −0.38 | −0.38 | −0.48 |
| (14) r8/f | 2.57 | 3.31 | 1.88 | 1.91 | 2.14 | 2.68 |
| (15) f4/f | −4.06 | −4.15 | −2.77 | −4.00 | −3.34 | −3.59 |
| (16) f23/f | 1.18 | 1.17 | 1.15 | 1.31 | 1.23 | 1.18 |
| (17) f1/f3 | 1.36 | 1.38 | 1.26 | 1.28 | 1.33 | 1.29 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: aperture stop,
L1: first lens,
L2: second lens,
L3: third lens,
L4: fourth lens,
L5: fifth lens,
ih: maximum image height,
IR: filter, and
IMG: image plane.

What is claimed is:

1. An imaging lens comprising in order from an object side to an image side,
a first lens having positive refractive power and a convex surface facing the object side near the optical axis,
a second lens having negative refractive power near the optical axis,
a third lens having the positive refractive power near the optical axis,
a fourth lens, and
a fifth lens having the negative refractive power and a concave surface facing the image side near the optical axis, wherein the image-side surface of said fifth lens is formed as an aspheric surface having at least one off-axial pole point, and below conditional expressions (1), (2), (3), and 7 are satisfied:

$$0.15 < vd4/vd5 < 0.55 \quad (1)$$

$$0.7 < T1/T2 < 3.0 \quad (2)$$

$$1.1 |r7|/r8 \quad (3)$$

$$2.35 < T2/T3 < 8.10 \quad (7)$$

where
vd4: abbe number at d-ray of the fourth lens,
vd5: abbe number at d-ray of the fifth lens,
T1: distance along the optical axis from the image-side surface of the first lens to the object-side surface of the second lens,
T2: distance along the optical axis from the image-side surface of the second lens to the object-side surface of the third lens,
r7: paraxial curvature radius of the object-side surface of the fourth lens, r8: paraxial curvature radius of the image-side surface of the fourth lens, and T3: distance along the optical axis from the image-side surface of the third lens to the object-side surface of the fourth lens.

2. The imaging lens according to claim 1, wherein an object-side surface of said third lens is a concave surface facing the object side near the optical axis.

3. The imaging lens according to claim 1, wherein a below conditional expression (4) is satisfied:

$$6 < (T1/f) \times 100 < 18 \tag{4}$$

where

T1: distance along the optical axis from the image-side surface of the first lens to the object-side surface of the second lens, f: focal length of the overall optical system of the imaging lens.

4. The imaging lens according to claim 1, wherein a below conditional expression (6) is satisfied:

$$0.7 < (T3/f) \times 100 < 2.7 \tag{6}$$

where

T3: distance along the optical axis from the image-side surface of the third lens to the object-side surface of the fourth lens, f: focal length of the overall optical system of the imaging lens.

5. The imaging lens according to claim 1, wherein a below conditional expression (9) is satisfied:

$$-0.65 < r6/f < -0.10 \tag{9}$$

where r6: paraxial curvature radius of the image-side surface of the third lens, f: focal length of the overall optical system of the imaging lens.

6. The imaging lens according to claim 1, wherein a below conditional expression (10) is satisfied:

$$8.5 < (D3/f3) \times 100 < 50.0 \tag{10}$$

where

D3: thickness along the optical axis of the third lens, f3: focal length of the third lens.

7. The imaging lens according to claim 1, wherein a below conditional expression (11) is satisfied:

$$0.35 < f3/f < 1.60 \tag{11}$$

where f3: focal length of the third lens, f: focal length of the overall optical system of the imaging lens.

8. The imaging lens according to claim 1, wherein a below conditional expression (12) is satisfied:

$$-10.50 < f2/f3 < -1.75 \tag{12}$$

where f2: focal length of the second lens, f3: focal length of the third lens.

9. The imaging lens according to claim 1, wherein a below conditional expression (13) is satisfied:

$$-1.10 < f3/f5 < -0.15 \tag{13}$$

where f3: focal length of the third lens, f5: focal length of the fifth lens.

* * * * *